United States Patent
Fachan et al.

(10) Patent No.: US 8,214,400 B2
(45) Date of Patent: *Jul. 3, 2012

(54) SYSTEMS AND METHODS FOR MAINTAINING DISTRIBUTED DATA

(75) Inventors: Neal T. Fachan, Seattle, WA (US); Aaron J. Passey, Seattle, WA (US); Darren P. Schack, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/862,060

(22) Filed: Aug. 24, 2010

(65) Prior Publication Data

US 2011/0035412 A1 Feb. 10, 2011

Related U.S. Application Data

(63) Continuation of application No. 11/255,818, filed on Oct. 21, 2005, now Pat. No. 7,797,283.

(51) Int. Cl.
*G06F 7/00* (2006.01)
*G06F 17/30* (2006.01)
(52) U.S. Cl. ...................................................... 707/793
(58) Field of Classification Search ............ 707/999.103, 707/655, 787, 793, 797
See application file for complete search history.

(56) References Cited

U.S. PATENT DOCUMENTS

| | | | |
|---|---|---|---|
| 4,780,796 A | 10/1988 | Fukuda et al. | |
| 5,163,131 A | 11/1992 | Row et al. | |
| 5,181,162 A | 1/1993 | Smith et al. | |
| 5,212,784 A | 5/1993 | Sparks | |
| 5,230,047 A | 7/1993 | Frey et al. | |
| 5,251,206 A | 10/1993 | Calvignac et al. | |
| 5,258,984 A | 11/1993 | Menon et al. | |
| 5,329,626 A | 7/1994 | Klein et al. | |
| 5,359,594 A | 10/1994 | Gould et al. | |
| 5,403,639 A | 4/1995 | Belsan et al. | |
| 5,423,046 A | 6/1995 | Nunnelley et al. | |
| 5,459,871 A | 10/1995 | Van Den Berg | |
| 5,481,699 A | 1/1996 | Saether | |
| 5,548,724 A | 8/1996 | Akizawa et al. | |
| 5,548,795 A | 8/1996 | Au | |
| 5,568,629 A | 10/1996 | Gentry et al. | |

(Continued)

FOREIGN PATENT DOCUMENTS

EP 0774723 5/1997

(Continued)

OTHER PUBLICATIONS

Nov. 15, 2002 Int'l Search report PCT/US02/24728, 2 pages.

(Continued)

*Primary Examiner* — Alexey Shmatov
(74) *Attorney, Agent, or Firm* — Knobbe Martens Olson & Bear LLP

(57) ABSTRACT

Systems and methods are disclosed that provide an indexing data structure. In one embodiment, the indexing data structure is mirrored index tree where the copies of the nodes of the tree are stored across devices in a distributed system. In one embodiment, nodes that are stored on an offline device are restored, and an offline device that comes back online is merged into the distributed system and given access to the current indexing data structure. In one embodiment, the indexing data structure is traversed to locate and restore nodes that are stored on offline devices of the distributed system.

20 Claims, 20 Drawing Sheets

U.S. PATENT DOCUMENTS

| | | | |
|---|---|---|---|
| 5,596,709 A | 1/1997 | Bond et al. |
| 5,606,669 A | 2/1997 | Bertin et al. |
| 5,612,865 A | 3/1997 | Dasgupta |
| 5,649,200 A | 7/1997 | Leblang et al. |
| 5,657,439 A | 8/1997 | Jones et al. |
| 5,668,943 A | 9/1997 | Attanasio et al. |
| 5,680,621 A | 10/1997 | Korenshtein |
| 5,694,593 A | 12/1997 | Baclawski |
| 5,696,895 A | 12/1997 | Hemphill et al. |
| 5,734,826 A | 3/1998 | Olnowich et al. |
| 5,754,756 A | 5/1998 | Watanabe et al. |
| 5,761,659 A | 6/1998 | Bertoni |
| 5,774,643 A | 6/1998 | Lubbers et al. |
| 5,799,305 A | 8/1998 | Bortvedt et al. |
| 5,805,578 A | 9/1998 | Stirpe et al. |
| 5,805,900 A | 9/1998 | Fagen et al. |
| 5,806,065 A | 9/1998 | Lomet |
| 5,822,790 A | 10/1998 | Mehrotra |
| 5,862,312 A | 1/1999 | Mann et al. |
| 5,870,563 A | 2/1999 | Roper et al. |
| 5,878,410 A | 3/1999 | Zbikowski et al. |
| 5,878,414 A | 3/1999 | Hsiao et al. |
| 5,884,046 A | 3/1999 | Antonov |
| 5,884,098 A | 3/1999 | Mason, Jr. |
| 5,884,303 A | 3/1999 | Brown |
| 5,890,147 A | 3/1999 | Peltonen et al. |
| 5,917,998 A | 6/1999 | Cabrera et al. |
| 5,933,834 A | 8/1999 | Aichelen |
| 5,943,690 A | 8/1999 | Dorricott et al. |
| 5,963,963 A | 10/1999 | Schmuck et al. |
| 5,966,707 A | 10/1999 | Van Huben et al. |
| 5,983,232 A | 11/1999 | Zhang |
| 5,996,089 A | 11/1999 | Mann |
| 6,000,007 A | 12/1999 | Leung et al. |
| 6,014,669 A | 1/2000 | Slaughter et al. |
| 6,021,414 A | 2/2000 | Fuller |
| 6,029,168 A | 2/2000 | Frey |
| 6,038,570 A | 3/2000 | Hitz et al. |
| 6,044,367 A | 3/2000 | Wolff et al. |
| 6,052,759 A | 4/2000 | Stallmo et al. |
| 6,055,543 A | 4/2000 | Christensen et al. |
| 6,055,564 A | 4/2000 | Phaal |
| 6,070,172 A | 5/2000 | Lowe |
| 6,081,833 A | 6/2000 | Okamoto et al. |
| 6,081,883 A | 6/2000 | Popelka et al. |
| 6,108,759 A | 8/2000 | Orcutt et al. |
| 6,117,181 A | 9/2000 | Dearth et al. |
| 6,122,754 A | 9/2000 | Litwin et al. |
| 6,136,176 A | 10/2000 | Wheeler et al. |
| 6,138,126 A | 10/2000 | Hitz et al. |
| 6,154,854 A | 11/2000 | Stallmo |
| 6,169,972 B1 | 1/2001 | Kono et al. |
| 6,173,374 B1 | 1/2001 | Heil et al. |
| 6,202,085 B1 | 3/2001 | Benson et al. |
| 6,209,059 B1 | 3/2001 | Ofer et al. |
| 6,219,693 B1 | 4/2001 | Napolitano et al. |
| 6,226,377 B1 | 5/2001 | Donaghue, Jr. |
| 6,247,108 B1 | 6/2001 | Long |
| 6,279,007 B1 | 8/2001 | Uppala |
| 6,321,345 B1 | 11/2001 | Mann |
| 6,334,168 B1 | 12/2001 | Islam et al. |
| 6,334,966 B1 | 1/2002 | Hahn et al. |
| 6,353,823 B1 | 3/2002 | Kumar |
| 6,384,626 B2 | 5/2002 | Tsai et al. |
| 6,385,626 B1 | 5/2002 | Tamer et al. |
| 6,393,483 B1 | 5/2002 | Latif et al. |
| 6,397,311 B1 | 5/2002 | Capps |
| 6,405,219 B2 | 6/2002 | Saether et al. |
| 6,408,313 B1 | 6/2002 | Campbell et al. |
| 6,415,259 B1 | 7/2002 | Wolfinger et al. |
| 6,421,781 B1 | 7/2002 | Fox et al. |
| 6,434,574 B1 | 8/2002 | Day et al. |
| 6,449,730 B2 | 9/2002 | Mann |
| 6,453,389 B1 | 9/2002 | Weinberger et al. |
| 6,457,139 B1 | 9/2002 | D'Errico et al. |
| 6,463,442 B1 | 10/2002 | Bent et al. |
| 6,496,842 B1 | 12/2002 | Lyness et al. |
| 6,499,091 B1 | 12/2002 | Bergsten |
| 6,502,172 B2 | 12/2002 | Chang |
| 6,502,174 B1 | 12/2002 | Beardsley |
| 6,523,130 B1 | 2/2003 | Hickman et al. |
| 6,526,478 B1 | 2/2003 | Kirby |
| 6,546,443 B1 | 4/2003 | Kakivaya et al. |
| 6,549,513 B1 | 4/2003 | Chao et al. |
| 6,557,114 B2 | 4/2003 | Mann |
| 6,567,894 B1 | 5/2003 | Hsu et al. |
| 6,567,926 B2 | 5/2003 | Mann |
| 6,571,244 B1 | 5/2003 | Larson |
| 6,571,349 B1 | 5/2003 | Mann |
| 6,574,745 B2 | 6/2003 | Mann |
| 6,594,655 B2 | 7/2003 | Tal et al. |
| 6,594,660 B1 | 7/2003 | Berkowitz et al. |
| 6,594,744 B1 | 7/2003 | Humlicek et al. |
| 6,598,174 B1 | 7/2003 | Parks et al. |
| 6,618,798 B1 | 9/2003 | Burton et al. |
| 6,631,411 B1 | 10/2003 | Welter et al. |
| 6,658,554 B1 | 12/2003 | Moshovos et al. |
| 6,662,184 B1 | 12/2003 | Friedberg |
| 6,668,304 B1 | 12/2003 | Satran et al. |
| 6,671,686 B2 | 12/2003 | Pardon et al. |
| 6,671,704 B1 | 12/2003 | Gondi et al. |
| 6,671,772 B1 | 12/2003 | Cousins |
| 6,687,805 B1 | 2/2004 | Cochran |
| 6,725,392 B1 | 4/2004 | Frey et al. |
| 6,732,125 B1 | 5/2004 | Autrey et al. |
| 6,742,020 B1 | 5/2004 | Dimitroff et al. |
| 6,748,429 B1 | 6/2004 | Talluri et al. |
| 6,801,949 B1 | 10/2004 | Bruck et al. |
| 6,848,029 B2 | 1/2005 | Coldewey |
| 6,856,591 B1 | 2/2005 | Ma et al. |
| 6,871,295 B2 | 3/2005 | Ulrich et al. |
| 6,895,482 B1 | 5/2005 | Blackmon et al. |
| 6,895,534 B2 | 5/2005 | Wong et al. |
| 6,907,011 B1 | 6/2005 | Miller et al. |
| 6,907,520 B2 | 6/2005 | Parady |
| 6,917,942 B1 | 7/2005 | Burns et al. |
| 6,920,494 B2 | 7/2005 | Heitman et al. |
| 6,922,696 B1 | 7/2005 | Lincoln et al. |
| 6,922,708 B1 | 7/2005 | Sedlar |
| 6,934,878 B2 | 8/2005 | Massa et al. |
| 6,940,966 B2 | 9/2005 | Lee |
| 6,954,435 B2 | 10/2005 | Billhartz et al. |
| 6,990,604 B2 | 1/2006 | Binger |
| 6,990,611 B2 | 1/2006 | Busser |
| 7,007,044 B1 | 2/2006 | Rafert et al. |
| 7,007,097 B1 | 2/2006 | Huffman et al. |
| 7,010,622 B1 * | 3/2006 | Bauer et al. ............... 709/252 |
| 7,017,003 B2 | 3/2006 | Murotani et al. |
| 7,043,485 B2 | 5/2006 | Manley et al. |
| 7,043,567 B2 | 5/2006 | Trantham |
| 7,058,639 B1 | 6/2006 | Chatterjee et al. |
| 7,069,320 B1 | 6/2006 | Chang et al. |
| 7,103,597 B2 | 9/2006 | McGoveran |
| 7,111,305 B2 | 9/2006 | Solter et al. |
| 7,113,938 B2 | 9/2006 | Highleyman et al. |
| 7,124,264 B2 | 10/2006 | Yamashita |
| 7,146,524 B2 | 12/2006 | Patel et al. |
| 7,152,182 B2 | 12/2006 | Ji et al. |
| 7,165,192 B1 * | 1/2007 | Cadieux et al. ............... 714/43 |
| 7,177,295 B1 | 2/2007 | Sholander et al. |
| 7,181,746 B2 | 2/2007 | Perycz et al. |
| 7,184,421 B1 | 2/2007 | Liu et al. |
| 7,194,487 B1 | 3/2007 | Kekre et al. |
| 7,206,805 B1 | 4/2007 | McLaughlin, Jr. |
| 7,225,204 B2 | 5/2007 | Manley et al. |
| 7,228,299 B1 | 6/2007 | Harmer et al. |
| 7,240,235 B2 | 7/2007 | Lewalski-Brechter |
| 7,249,118 B2 | 7/2007 | Sandler et al. |
| 7,257,257 B2 | 8/2007 | Anderson et al. |
| 7,290,056 B1 | 10/2007 | McLaughlin, Jr. |
| 7,313,614 B2 | 12/2007 | Considine et al. |
| 7,318,134 B1 | 1/2008 | Oliveira et al. |
| 7,346,720 B2 | 3/2008 | Fachan |
| 7,370,064 B2 | 5/2008 | Yousefi'zadeh |
| 7,373,426 B2 | 5/2008 | Jinmei et al. |
| 7,386,675 B2 | 6/2008 | Fachan |
| 7,386,697 B1 | 6/2008 | Case et al. |

| Patent No. | Date | Inventor(s) |
|---|---|---|
| 7,440,966 B2 | 10/2008 | Adkins et al. |
| 7,451,341 B2 | 11/2008 | Okaki et al. |
| 7,502,801 B2 | 3/2009 | Sawdon et al. |
| 7,509,448 B2 | 3/2009 | Fachan et al. |
| 7,509,524 B2 | 3/2009 | Patel et al. |
| 7,533,298 B2 | 5/2009 | Smith et al. |
| 7,546,354 B1 | 6/2009 | Fan et al. |
| 7,546,412 B2 | 6/2009 | Ahmad et al. |
| 7,551,572 B2 | 6/2009 | Passey et al. |
| 7,558,910 B2 | 7/2009 | Alverson et al. |
| 7,571,348 B2 | 8/2009 | Deguchi et al. |
| 7,577,258 B2 | 8/2009 | Wiseman et al. |
| 7,577,667 B2 | 8/2009 | Hinshaw et al. |
| 7,590,652 B2 | 9/2009 | Passey et al. |
| 7,593,938 B2 | 9/2009 | Lemar et al. |
| 7,596,713 B2 | 9/2009 | Mani-Meitav et al. |
| 7,617,289 B2 | 11/2009 | Srinivasan et al. |
| 7,631,066 B1 | 12/2009 | Schatz et al. |
| 7,639,818 B2 | 12/2009 | Fujimoto et al. |
| 7,665,123 B1 | 2/2010 | Szor et al. |
| 7,676,691 B2 | 3/2010 | Fachan et al. |
| 7,680,836 B2 | 3/2010 | Anderson et al. |
| 7,680,842 B2 | 3/2010 | Anderson et al. |
| 7,685,126 B2 | 3/2010 | Patel et al. |
| 7,685,162 B2 | 3/2010 | Heider et al. |
| 7,689,597 B1 | 3/2010 | Bingham et al. |
| 7,707,193 B2 | 4/2010 | Zayas et al. |
| 7,716,262 B2 | 5/2010 | Pallapotu |
| 7,734,603 B1 | 6/2010 | McManis |
| 7,739,288 B2 | 6/2010 | Lemar et al. |
| 7,743,033 B2 | 6/2010 | Patel et al. |
| 7,752,226 B1 | 7/2010 | Harmer et al. |
| 7,752,402 B2 | 7/2010 | Fachan et al. |
| 7,756,898 B2 | 7/2010 | Passey et al. |
| 7,779,048 B2 | 8/2010 | Fachan et al. |
| 7,783,666 B1 | 8/2010 | Zhuge et al. |
| 7,788,303 B2 | 8/2010 | Mikesell et al. |
| 7,797,283 B2 | 9/2010 | Fachan et al. |
| 7,797,323 B1 | 9/2010 | Eshghi et al. |
| 7,822,932 B2 | 10/2010 | Fachan et al. |
| 7,840,536 B1 | 11/2010 | Ahal et al. |
| 7,844,617 B2 | 11/2010 | Lemar et al. |
| 7,848,261 B2 | 12/2010 | Fachan |
| 7,870,345 B2 | 1/2011 | Daud et al. |
| 7,882,068 B2 | 2/2011 | Schack et al. |
| 7,882,071 B2 | 2/2011 | Fachan et al. |
| 7,899,800 B2 | 3/2011 | Fachan et al. |
| 7,900,015 B2 | 3/2011 | Fachan et al. |
| 7,917,474 B2 | 3/2011 | Passey et al. |
| 7,937,421 B2 | 5/2011 | Mikesell et al. |
| 7,949,636 B2 | 5/2011 | Akidau et al. |
| 7,949,692 B2 | 5/2011 | Lemar et al. |
| 7,953,704 B2 | 5/2011 | Anderson et al. |
| 7,953,709 B2 | 5/2011 | Akidau et al. |
| 7,962,779 B2 | 6/2011 | Patel et al. |
| 7,966,289 B2 | 6/2011 | Lu et al. |
| 7,971,021 B2 | 6/2011 | Daud et al. |
| 7,984,324 B2 | 7/2011 | Daud et al. |
| 8,005,865 B2 | 8/2011 | Passey et al. |
| 8,010,493 B2 | 8/2011 | Anderson et al. |
| 8,015,216 B2 | 9/2011 | Fachan et al. |
| 2001/0042224 A1 | 11/2001 | Stanfill et al. |
| 2001/0047451 A1 | 11/2001 | Noble et al. |
| 2001/0056492 A1 | 12/2001 | Bressoud et al. |
| 2002/0010696 A1 | 1/2002 | Izumi |
| 2002/0029200 A1 | 3/2002 | Dulin et al. |
| 2002/0035668 A1 | 3/2002 | Nakano et al. |
| 2002/0038436 A1 | 3/2002 | Suzuki |
| 2002/0049778 A1 | 4/2002 | Bell et al. |
| 2002/0055940 A1 | 5/2002 | Elkan |
| 2002/0072974 A1 | 6/2002 | Pugliese et al. |
| 2002/0075870 A1 | 6/2002 | de Azevedo et al. |
| 2002/0078161 A1 | 6/2002 | Cheng |
| 2002/0078180 A1 | 6/2002 | Miyazawa |
| 2002/0083078 A1 | 6/2002 | Pardon et al. |
| 2002/0083118 A1 | 6/2002 | Sim |
| 2002/0087366 A1 | 7/2002 | Collier et al. |
| 2002/0095438 A1 | 7/2002 | Rising et al. |
| 2002/0107877 A1 | 8/2002 | Whiting et al. |
| 2002/0124137 A1 | 9/2002 | Ulrich et al. |
| 2002/0138559 A1 | 9/2002 | Ulrich et al. |
| 2002/0156840 A1 | 10/2002 | Ulrich et al. |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Staub et al. |
| 2002/0158900 A1 | 10/2002 | Hsieh et al. |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0163889 A1 | 11/2002 | Yemini et al. |
| 2002/0165942 A1 | 11/2002 | Ulrich et al. |
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0170036 A1 | 11/2002 | Cobb et al. |
| 2002/0174295 A1 | 11/2002 | Ulrich et al. |
| 2002/0174296 A1 | 11/2002 | Ulrich et al. |
| 2002/0178162 A1 | 11/2002 | Ulrich et al. |
| 2002/0191311 A1 | 12/2002 | Ulrich et al. |
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0005159 A1 | 1/2003 | Kumhyr |
| 2003/0009511 A1 | 1/2003 | Giotta et al. |
| 2003/0014391 A1 | 1/2003 | Evans et al. |
| 2003/0033308 A1 | 2/2003 | Patel et al. |
| 2003/0061491 A1 | 3/2003 | Jaskiewicz et al. |
| 2003/0109253 A1 | 6/2003 | Fenton et al. |
| 2003/0120863 A1 | 6/2003 | Lee et al. |
| 2003/0125852 A1 | 7/2003 | Schade et al. |
| 2003/0126522 A1 | 7/2003 | English et al. |
| 2003/0131860 A1 | 7/2003 | Ashcraft et al. |
| 2003/0135514 A1 | 7/2003 | Patel et al. |
| 2003/0149750 A1 | 8/2003 | Franzenburg |
| 2003/0158861 A1 * | 8/2003 | Sawdon et al. .......... 707/200 |
| 2003/0158873 A1 | 8/2003 | Sawdon et al. |
| 2003/0161302 A1 | 8/2003 | Zimmermann et al. |
| 2003/0163726 A1 | 8/2003 | Kidd |
| 2003/0172149 A1 | 9/2003 | Edsall et al. |
| 2003/0177308 A1 | 9/2003 | Lewalski-Brechter |
| 2003/0182312 A1 | 9/2003 | Chen et al. |
| 2003/0182325 A1 | 9/2003 | Manely et al. |
| 2003/0233385 A1 | 12/2003 | Srinivasa et al. |
| 2003/0237019 A1 | 12/2003 | Kleiman et al. |
| 2004/0003053 A1 | 1/2004 | Williams |
| 2004/0024731 A1 | 2/2004 | Cabrera et al. |
| 2004/0024963 A1 | 2/2004 | Talagala et al. |
| 2004/0078680 A1 | 4/2004 | Hu et al. |
| 2004/0078812 A1 | 4/2004 | Calvert |
| 2004/0117802 A1 | 6/2004 | Green |
| 2004/0133670 A1 | 7/2004 | Kaminksky et al. |
| 2004/0143647 A1 | 7/2004 | Cherkasova |
| 2004/0153479 A1 | 8/2004 | Mikesell et al. |
| 2004/0158549 A1 | 8/2004 | Matena et al. |
| 2004/0174798 A1 | 9/2004 | Riguidel et al. |
| 2004/0189682 A1 | 9/2004 | Troyansky et al. |
| 2004/0199734 A1 | 10/2004 | Rajamani et al. |
| 2004/0199812 A1 | 10/2004 | Earl et al. |
| 2004/0205141 A1 | 10/2004 | Goland |
| 2004/0230748 A1 | 11/2004 | Ohba |
| 2004/0240444 A1 | 12/2004 | Matthews et al. |
| 2004/0260673 A1 | 12/2004 | Hitz et al. |
| 2004/0267747 A1 | 12/2004 | Choi et al. |
| 2005/0010592 A1 | 1/2005 | Guthrie |
| 2005/0033778 A1 | 2/2005 | Price |
| 2005/0044197 A1 | 2/2005 | Lai |
| 2005/0066095 A1 | 3/2005 | Mullick et al. |
| 2005/0114402 A1 | 5/2005 | Guthrie |
| 2005/0114609 A1 | 5/2005 | Shorb |
| 2005/0125456 A1 | 6/2005 | Hara et al. |
| 2005/0131860 A1 | 6/2005 | Livshits |
| 2005/0131990 A1 | 6/2005 | Jewell |
| 2005/0138195 A1 | 6/2005 | Bono |
| 2005/0138252 A1 | 6/2005 | Gwilt |
| 2005/0171960 A1 | 8/2005 | Lomet |
| 2005/0171962 A1 | 8/2005 | Martin et al. |
| 2005/0187889 A1 | 8/2005 | Yasoshima |

| | | |
|---|---|---|
| 2005/0188052 A1 | 8/2005 | Ewanchuk et al. |
| 2005/0192993 A1 | 9/2005 | Messinger |
| 2005/0193389 A1 | 9/2005 | Murphy et al. |
| 2005/0289169 A1 | 12/2005 | Adya et al. |
| 2005/0289188 A1 | 12/2005 | Nettleton et al. |
| 2006/0004760 A1 | 1/2006 | Clift et al. |
| 2006/0041894 A1 | 2/2006 | Cheng |
| 2006/0047713 A1 | 3/2006 | Gornshtein et al. |
| 2006/0047925 A1 | 3/2006 | Perry |
| 2006/0053263 A1 | 3/2006 | Prahlad et al. |
| 2006/0059467 A1 | 3/2006 | Wong |
| 2006/0074922 A1 | 4/2006 | Nishimura |
| 2006/0083177 A1 | 4/2006 | Iyer et al. |
| 2006/0095438 A1 | 5/2006 | Fachan et al. |
| 2006/0101062 A1 | 5/2006 | Godman et al. |
| 2006/0129584 A1 | 6/2006 | Hoang et al. |
| 2006/0129631 A1 | 6/2006 | Na et al. |
| 2006/0129983 A1 | 6/2006 | Feng |
| 2006/0155831 A1 | 7/2006 | Chandrasekaran |
| 2006/0206536 A1 | 9/2006 | Sawdon et al. |
| 2006/0230411 A1 | 10/2006 | Richter et al. |
| 2006/0277432 A1 | 12/2006 | Patel |
| 2006/0288161 A1 | 12/2006 | Cavallo |
| 2006/0294589 A1 | 12/2006 | Achanta et al. |
| 2007/0038887 A1 | 2/2007 | Witte et al. |
| 2007/0091790 A1 | 4/2007 | Passey et al. |
| 2007/0094269 A1 | 4/2007 | Mikesell et al. |
| 2007/0094277 A1 | 4/2007 | Fachan et al. |
| 2007/0094310 A1 | 4/2007 | Passey et al. |
| 2007/0094431 A1 | 4/2007 | Fachan |
| 2007/0094449 A1 | 4/2007 | Allison et al. |
| 2007/0094452 A1 | 4/2007 | Fachan |
| 2007/0124337 A1 | 5/2007 | Flam |
| 2007/0168351 A1 | 7/2007 | Fachan |
| 2007/0171919 A1 | 7/2007 | Godman et al. |
| 2007/0192254 A1 | 8/2007 | Hinkle |
| 2007/0195810 A1 | 8/2007 | Fachan |
| 2007/0233684 A1 | 10/2007 | Verma et al. |
| 2007/0233710 A1 | 10/2007 | Passey et al. |
| 2007/0244877 A1 | 10/2007 | Kempka |
| 2007/0255765 A1 | 11/2007 | Robinson |
| 2007/0255921 A1 | 11/2007 | Gole et al. |
| 2007/0288490 A1 | 12/2007 | Longshaw |
| 2008/0005145 A1 | 1/2008 | Worrall |
| 2008/0010507 A1 | 1/2008 | Vingralek |
| 2008/0021907 A1 | 1/2008 | Patel et al. |
| 2008/0031238 A1 | 2/2008 | Harmelin et al. |
| 2008/0034004 A1 | 2/2008 | Cisler et al. |
| 2008/0044016 A1 | 2/2008 | Henzinger |
| 2008/0046432 A1 | 2/2008 | Anderson et al. |
| 2008/0046443 A1 | 2/2008 | Fachan et al. |
| 2008/0046444 A1 | 2/2008 | Fachan et al. |
| 2008/0046445 A1 | 2/2008 | Passey et al. |
| 2008/0046475 A1 | 2/2008 | Anderson et al. |
| 2008/0046476 A1 | 2/2008 | Anderson et al. |
| 2008/0046667 A1 | 2/2008 | Fachan et al. |
| 2008/0059541 A1 | 3/2008 | Fachan et al. |
| 2008/0059734 A1 | 3/2008 | Mizuno |
| 2008/0126365 A1 | 5/2008 | Fachan et al. |
| 2008/0151724 A1 | 6/2008 | Anderson et al. |
| 2008/0154978 A1 | 6/2008 | Lemar et al. |
| 2008/0155191 A1 | 6/2008 | Anderson et al. |
| 2008/0168209 A1 | 7/2008 | Davison |
| 2008/0168304 A1 | 7/2008 | Flynn et al. |
| 2008/0168458 A1 | 7/2008 | Fachan et al. |
| 2008/0243773 A1 | 10/2008 | Patel et al. |
| 2008/0256103 A1 | 10/2008 | Fachan et al. |
| 2008/0256537 A1 | 10/2008 | Fachan et al. |
| 2008/0256545 A1 | 10/2008 | Akidau et al. |
| 2008/0263549 A1 | 10/2008 | Walker |
| 2008/0294611 A1 | 11/2008 | Anglin et al. |
| 2009/0055399 A1 | 2/2009 | Lu et al. |
| 2009/0055604 A1 | 2/2009 | Lemar et al. |
| 2009/0055607 A1 | 2/2009 | Schack et al. |
| 2009/0125563 A1 | 5/2009 | Wong et al. |
| 2009/0210880 A1 | 8/2009 | Fachan et al. |
| 2009/0248756 A1 | 10/2009 | Akidau et al. |
| 2009/0248765 A1 | 10/2009 | Akidau et al. |
| 2009/0248975 A1 | 10/2009 | Daud et al. |
| 2009/0249013 A1 | 10/2009 | Daud et al. |
| 2009/0252066 A1 | 10/2009 | Passey et al. |
| 2009/0327218 A1 | 12/2009 | Passey et al. |
| 2010/0122057 A1 | 5/2010 | Strumpen et al. |
| 2010/0161556 A1 | 6/2010 | Anderson et al. |
| 2010/0161557 A1 | 6/2010 | Anderson et al. |
| 2010/0185592 A1 | 7/2010 | Kryger |
| 2010/0223235 A1 | 9/2010 | Fachan |
| 2010/0235413 A1 | 9/2010 | Patel |
| 2010/0241632 A1 | 9/2010 | Lemar et al. |
| 2010/0306786 A1 | 12/2010 | Passey |
| 2011/0016155 A1 | 1/2011 | Fachan et al. |
| 2011/0016353 A1 | 1/2011 | Mikesell et al. |
| 2011/0022790 A1 | 1/2011 | Fachan |
| 2011/0044209 A1 | 2/2011 | Fachan |
| 2011/0060779 A1 | 3/2011 | Lemar et al. |
| 2011/0087635 A1 | 4/2011 | Fachan |
| 2011/0113211 A1 | 5/2011 | Fachan et al. |
| 2011/0119234 A1 | 5/2011 | Schack et al. |
| 2011/0145195 A1 | 6/2011 | Passey et al. |
| 2011/0153569 A1 | 6/2011 | Fachan et al. |

FOREIGN PATENT DOCUMENTS

| | | |
|---|---|---|
| EP | 1421520 | 5/2004 |
| EP | 1563411 | 8/2005 |
| EP | 2284735 | 2/2011 |
| EP | 2299375 | 3/2011 |
| JP | 04096841 | 3/1992 |
| JP | 2006-506741 | 6/2004 |
| JP | 4464279 | 5/2010 |
| JP | 4504677 | 7/2010 |
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |
| WO | WO 2008/127947 | 10/2008 |

OTHER PUBLICATIONS

Apr. 20, 2004 Int'l Search report PCT/US03/36699, 10 pages.
Aug. 6, 2004 Int'l Search report PCT/US03/33704, 11 pages.
May 21, 2007 European Search Report EP 02756944.1-2201, 8 pages.
Oct. 8, 2008 European Supplemental Search Report EP 02 75 6944, 6 pages.
Jan. 23, 2009 Examination Report EP 02 75 6944, 5 pages.
Feb. 22, 2008 Int'l Search report PCT/US07/018326, 20 pages.
May 8, 2008 Int'l Search report PCT/US07/018324, 13 pages.
May 18, 2009 Int'l Search report PCT/US08/059798, 18 pages.
Oct. 22, 2009 Intl Preliminary Report on Patentability PCT/US08/059798, 10 pages.
Philip A. Bernstein, Vassos Hadzilacos, and Nathan Goodman, Concurrency Control and Recovery in Database Systems, Addison-Wesley, 1987, pp. iii-270.
Kenneth P. Birman, Building Secure and Reliable Network Applications, Manning, 1996, pp. xvi-300.
Kenneth P. Birman, Building Secure and Reliable Network Applications, Manning, 1996, pp. 301-591.
Birk, Y., Deterministic load-balancing schemes for disk-based video-on-demand storage servers, Mass Storage Systems 1995; Storage—At the Forefront of Information Infrastructures', Proceedings of the Fourteenth IEEE Symposium on Monterey, CA, Sep. 11-14, 1995, pp. 17-25.
Coulouris et al., Distributed Systems Concepts and Design; Addison-Wesley, Second Edition, 1994, pp. 353-371 and 377-405.
Jim Gray and Andreas Reuter, Transaction Processing: Concepts and Techniques, Morgan Kaufmann, 1993, pp. v-290.
Jim Gray and Andreas Reuter, Transaction Processing: Concepts and Techniques, Morgan Kaufmann, 1993, pp. 291-628.
Jim Gray and Andreas Reuter, Transaction Processing: Concepts and Techniques, Morgan Kaufmann, 1993, pp. 630-1070.

Kumar, Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-81862025-6 p. 446, left-hand column, line 1—p. 447, last line.
Nancy A. Lynch, Distributed Algorithms, Morgan Kaufmann, 1996, pp. 1-395.
Nancy A. Lynch, Distributed Algorithms, Morgan Kaufmann, 1996 pp. 397-872.
Sape Mullender, editor, Distributed Systems (2nd Ed.), ACM Press/Addison-Wesley Publishing Co., New York, NY, USA, 1993, pp. v-315.
Sape Mullender, editor, Distributed Systems (2nd Ed.), ACM Press/Addison-Wesley Publishing Co., New York, NY, USA, 1993, pp. 316-595.
Gibson, Garth A. et al., *The Scotch Parallel Storage System*, IEEE, 1995, pp. 403-410.
Gerhard Weikum, et al., Transactional Information Systems: Theory, Algorithms, and the Practice of Concurrency Control and Recovery, Morgan Kaufmann, 2002, pp. ix-xxv and 2-435.
Gerhard Weikum, et al., Transactional Information Systems: Theory, Algorithms, and the Practice of Concurrency Control and Recovery, Morgan Kaufmann, 2002, pp. 436-853.
Sanjay Ghemawat et al., The Google File System, Symposium on Operating Systems Principles, Oct. 19-22, 2003, 15 pages, Bolton Landing, NY.
Pei Cao et al., The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Duzett, Bob et al., *An Overview of the nCube 3 Supercomputer*, IEEE, Jul. 1992, pp. 458-464.
Hartman, John Henry, *The Zebra Striped Network File System*, (Sc.B. (Brown University) 1987, pp. 1-148.
Keidar, et al.: Increasing the Resilience of Distributed and Replicated Database Systems (1998) pp. 1-25.
Long, Darrell D.E., et al., *Swift/RAID: A Distributed RAID System, Computing Systems*, vol. 7, No. 3 Summer 1994, pp. 333-359.
Stallings, William, Operating Systems, Prentice Hall, Fourth Edition; 2001, pp. 197-253 and 265-293.
Michael Stonebraker et al., Distributed Raid: A New Multiple Copy Algorithm, Proc. Sixth Int. Conf. Data Eng., IEEE Service Center, Piscataway, NJ (IEEE cat No. 90CH2840-7), pp. 430-437, Feb. 5, 1990.
United States Court of Appeals, Federal Circuit, *Seachange International, Inc.* Vs. *nCUBE, Corp.*, Oct. 26, 2004, 28 pages.
United States Court of Appeals, Federal Circuit, *Seachange International, Inc.* Vs. *C-Corp, Inc.*, Jun. 29, 2005, 22 pages.
United States District Court, Delaware, *Seachange International, Inc.* Vs. *nCUBE, Corp.*, Apr. 7, 2004, 13 pages.
United States District Court, Delaware, *Seachange International, Inc.* Vs. *nCUBE, Corp.*, Aug. 29, 2000, 12 pages.
Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 7, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007 (exhibits listed separately below), 1 page.
Isilon Systems, "Isilon IQ Platform Overview", 4 pages, 2007 (Exhibit A).
Isilon Systems, "Uncompromising Reliability through Clustered Storage", Sep. 2006, 10 pages. (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems 3rd ed, Sep. 30, 1999, Addison-Wesley, pp. 155-156, 169-173, 178-179, 181-182, 381, 771.
MCSA/MSCE/MCDBA Self Paced Training Kit: MS SQL Server 2000 System Administration, May 14, 2003, Microsoft Press, Second Edition, 12 pages.
Supp EPO Search Report, App. No. EP 03 78 3599; dated Apr. 29, 2008, 2 pages.
Levy E., Ed—Institute of Electrical and Electronics Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
Wedde H. F., et al.: "A universal framework for managing metadata in the distributed Dragon Slayer System", Proceedings of the Euromicro Conference. Euromicro. Informatics: Inventing the Future, Proceedings of Euromicro Workshop on Multimedia and Telecommunications, vol. 2, Sep. 5, 2000, pp. 96, 98, 100, 143, 141.
Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347-348.
Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.
Lougher P. et al., "Scalable storage servers for digital audio and video," International Conference on Storage and Recording Systems, 1994, Keele, UK, Jan. 1, 1994, pp. 140-143.
Reddy, P. Krishna et al., Reducing the blocking in two phase commit with backup sites Apr. 15, 2003, Elsevier, pp. 39-47.
IOS Commands, Feb. 6, 2005, Pantz.org, [online], <web.archive.org/web/20050206184604/http://pantz.org/os/ios/ioscommands.shtml>, 12 pages.
IP Forwarding with Cisco Routers Lab Exercises, Jun. 15, 1999 [online], <ws.edu.isoc.org/data1999/1481713642400af6a2de65a/ip_fwd_cisco_config.ppt>, 11 pages.
Hisayuki Aoki, Parallel Filesystem MFS, IPSJ SIG Technical Reports, Japan, Information Processing Society of Japan, Aug. 26, 1996, vol. 96, No. 79, pp. 31 to 36 (stamped Citation 1 / English Translation attached, 23 pages).
Yoshitake Shinkai, Cluster File System: HAMFS, FUJITSU, Japan, Fujitsu Limited, Jul. 9, 1999, vol. 50, No. 4, pp. 210 to 214 (stamped Citation 2 / English Translation attached, 16 pages).
Duchamp, Dan: "Analysis of Transaction Management Performance", ACM Symposium on Operating Systems Principles, Dec. 1989, pp. 177-190.
Silaghi, Raul et al.: "Porting OMTTs to CORBA", Lecture Notes in Computer Science, vol. 2888/2003, Nov. 2003, pp. 1521-1542.
Dorai et al.:, "Transport Threads: Resource Sharing in SMT Processor for High Single-Thread Performance", proceedings of the 2002 International Conference on Parallel Architectures and Complication Techniques, Sep. 2002, 12 pages.
Peterson, Zachary Nathaniel Joseph, "Data Placement for Copy-On-Write Using Virtual Contiguity," Master of Science in Computer Science Thesis, University of California, Santa Cruz, Sep. 2002, 67 pages.
Jan. 17, 2008 Non-Final Rejection in U.S. Appl. No. 11/255,337, filed Jan. 25, 2006.

May 20, 2008 Response to Jan. 17, 2008 Non-Final Rejection in U.S. Appl. No. 11/255,337, filed Jan. 25, 2006.
Oct. 21, 2008 Final Rejection in U.S. Appl. No. 11/255,337, filed Jan. 25, 2006.
Apr. 20, 2009 Response to Oct. 21, 2008 Final Rejection in U.S. Appl. No. 11/255,337, filed Jan. 25, 2006.
Jul. 24, 2009 Non-Final OA in U.S. Appl. No. 11/255,337, filed Jan. 25, 2006.
Oct. 26, 2009 Amendment to Jul. 24, 2009 Non-Final OA in U.S. Appl. No. 11/255,337, filed Jan. 25, 2006.
Mar. 29, 2010 Final OA in U.S. Appl. No. 11/255,337, filed Jan. 25, 2006.
Jul. 29, 2010 Response to Mar. 29, 2010 Final OA in U.S. Appl. No. 11/255,337, filed Jan. 25, 2006.
Sep. 13, 2010 Notice of Allowance in U.S. Appl. No. 11/255,337, filed Jan. 25, 2006.
HP, Slow Internal Disk, Feb. 22, 2005, p. 2 and 6, in 7 pages.
Shen et al., Distributed and Dynamic Task Reallocation in Robot Organizations; IEEE 2002, pp. 1019-1024.
Dec. 11, 2007 Non-Final Rejection in U.S. Appl. No. 11/255,818, filed Oct. 21, 2005.
May 12, 2008 Response to Dec. 11, 2007 Non-Final Rejection in U.S. Appl. No. 11/255,818, filed Oct. 21, 2005.
Oct. 2, 2008 Final Rejection in U.S. Appl. No. 11/255,818, filed Oct. 21, 2005.
Apr. 1, 2009 Response to Oct. 2, 2008 Final Rejection in U.S. Appl. No. 11/255,818, filed Oct. 21, 2005.
Jun. 4, 2009 Non-Final Rejection in U.S. Appl. No. 11/255,818, filed Oct. 21, 2005.
Sep. 4, 2009 Response to Jun. 4, 2009 Non-Final Rejection in U.S. Appl. No. 11/255,818, filed Oct. 21, 2005.
Dec. 21, 2009 Final OA in U.S. Appl. No. 11/255,818 filed, Oct. 21, 2005.
Jun. 1, 2010 Notice of Allowance in U.S. Appl. No. 11/255,818, filed Oct. 21, 2005.
Aug. 25, 2010 Issue Notification in U.S. Appl. No. 11/255,818, filed Oct. 21, 2005.
Feb. 22, 2011 Supplemental Notice of Allowance in U.S. Appl. No. 11/255,337, filed Oct. 21, 2005.
Mar. 10, 2011 issue Notification in U.S. Appl. No. 11/255,337, filed Oct. 21, 2005.
Aug. 11, 2011 Non-Final Office Action in U.S. Appl. No. 12/965,748, filed Dec. 10, 2010.

* cited by examiner

SYSTEMS AND METHODS FOR MAINTAINING DISTRIBUTED DATA

REFERENCE TO RELATED APPLICATIONS

This application is a continuation of and claims benefit of priority under 35 U.S.C. §120 to U.S. patent application Ser. No. 11/255,818, filed Oct. 21, 2005, issued as U.S. Pat. No. 7,797,283 on Sep. 14, 2010, titled "SYSTEMS AND METHODS FOR MAINTAINING DISTRIBUTED DATA", which is hereby incorporated by reference herein in its entirety. The present disclosure also relates to U.S. patent application Ser. No. 11/255,817, to be issued as U.S. Pat. No. 7,788,303 on Aug. 31, 2010, titled "SYSTEMS AND METHODS FOR DISTRIBUTED SYSTEM SCANNING," U.S. patent application Ser. No. 11/256,410, issued as U.S. Pat. No. 7,551,572 on Jun. 23, 2009, titled "SYSTEMS AND METHODS FOR PROVIDING VARIABLE PROTECTION," U.S. patent application Ser. No. 11/255,346, issued as U.S. Pat. No. 7,346,720 on Mar. 18, 2008, titled "SYSTEMS AND METHODS FOR MANAGING CONCURRENT ACCESS REQUESTS TO A SHARED RESOURCE," U.S. patent application Ser. No. 11/256,317, issued as U.S. Pat. No. 7,386,675 on Jun. 10, 2008, titled "SYSTEMS AND METHODS FOR USING EXCITEMENT VALUES TO PREDICT FUTURE ACCESS TO RESOURCES," and U.S. patent application Ser. No. 11/255,337, titled "SYSTEMS AND METHODS FOR ACCESSING AND UPDATING DISTRIBUTED DATA," each filed on Oct. 21, 2005 and each hereby incorporated by reference herein in their entireties.

FIELD OF THE INVENTION

The present disclosure generally relates to the field of distributed data management, and more particularly, to systems and methods for maintaining copies of index data.

BACKGROUND

The increase in processing power of computer systems has ushered in a new era in which information is accessed on a constant basis. One response has been to store and maintain data in a distributed manner across multiple nodes or devices. A distributed architecture allows for more flexible configurations with respect to factors such as access speed, bandwidth management, and other performance and reliability parameters. The distributed architecture also allows multiple copies of data to be stored across the system. According, if one copy of the data is not available, then other copies of the data may be retrieved. One type of data that may be stored across a distributed system is indexing data.

The indexing data is desirably protected in the event that one or more of the devices of the distributed system fail. In addition, when a device fails, the offline indexing data is desirably restored in case of a failure by other devices. Moreover, additional problems occur when one or more of the failed devices come back online and try to reintegrate into the system.

Because of the foregoing challenges and limitations, there is an ongoing need to improve the manner in which indexing data, stored across a distributed system, is managed especially in the event of device failure.

SUMMARY

Systems and methods are disclosed that provide an indexing data structure. The indexing data structure is stored as nodes across a distributed system and copies of the nodes are also stored across the system. In some embodiments, the systems and methods restore nodes that are stored on an inaccessible portion of the distributed system. In some embodiments, portions of the system that become accessible are merged into the distributed system and given access to the current indexing data structure. In addition, in some embodiments, the indexing data structure is traversed to locate and restore nodes that are stored on inaccessible portions of the distributed system.

One embodiment of the present disclosure relates to an indexing system that includes a plurality of storage devices configured to communicate with each other. The system further includes a set of database records each record with a distinct index. The system further includes a balanced index tree structure. The balanced index tree structure includes a first and second copy of a set of leaf nodes stored among the plurality of storage devices configured to store the set of database records based on the indexes. The balanced index tree structure further includes a first and second copy of a set of parent nodes of the leaf nodes stored among the plurality of storage devices and configured to store references to the first and second copy of the set of leaf nodes. The balanced index tree structure further includes a first and second copy of a set of grandparent nodes of the leaf nodes stored among the plurality of storage devices, configured to store references to the first and second copy of the parent nodes. The balanced index tree structure further includes a first and second copy of a root node configured to store references to the first and second copy of the grandparent nodes. The set of parent nodes, set of grandparent nodes, and the root node are configured to index the first and second copy of the set of leaf nodes based on the indexes in the form of a balanced tree.

Another embodiment of the present disclosure relates to an indexing system that includes a plurality of storage devices configured to communicate with each other. The system further includes a set of data units. The set of data units includes an index value for each data unit. The system further includes an index data structure. The indexing data structure includes a first and second copy of a set of first nodes stored among the plurality of storage devices. The indexing data structure further includes a first and second copy of a set of second nodes stored among the plurality of storage devices. The first and second copy of the set of second nodes configured to store the set of data units based on the index values of each data unit. The first and second copy of the set of first nodes configured to index the first and second copy of the set of second nodes based on the index values of the data units stored in the second nodes.

Yet another embodiment of the present disclosure relates to a method for indexing data in an index tree. The method includes providing an index tree with inner nodes, leaf nodes, redundant copies of the inner nodes, and redundant copies of the leaf nodes. The method further includes receiving a first data with a first index. The method further includes traversing the index tree to select one of the leaf nodes on which to store first data based at least on the first index. The method further includes storing the first data on the selected leaf node. The method further includes storing the first data on the redundant copy of the selected leaf node. The method further includes traversing the inner nodes and redundant copies of the inner nodes that are parents of the selected leaf node to update metadata related to the inner nodes and the redundant copies of the inner nodes to reflect the stored first data.

Yet another embodiment of the present disclosure relates to a method of modifying nodes stored on distributed indexed tree. The method includes receiving a target node. The target node and a copy of the target node are stored among a plurality of devices. The method further includes accessing a parent node of the target node. The method further includes determining that the copy of the target node is stored on a failed device of the plurality of devices. The method further includes modifying the target node. The method further includes creating a new copy of the target node. The method further includes storing the new copy of the target node on at least one of the plurality of devices that is not a failed device. The method further includes recursively updating the parent node.

Yet another embodiment of the present disclosure relates to a method of restoring mirrored nodes of a distributed indexed tree. The method includes receiving a parent node. The method further includes, for each child of the parent node, determining that at least one copy of the child is located on a failed drive; retrieving a copy of the child from a non-failed drive; creating a new copy of the child; storing the new copy of the child on a non-failed drive; updating the parent and copies of the parent to reference the new copy of the child; and recursively restoring the child.

Yet another embodiment of the present disclosure relates to a method of merging a first device into a plurality of devices. The method includes providing a first device configured to store a version value. The method further includes providing a plurality of devices, with each of the plurality of devices being configured to reference at least two copies of a mirrored index data structure and to store a version value. The method further includes receiving the first version value. The method further includes querying the plurality of devices for their corresponding version values. The method further includes determining a highest version value from the version values. The method further includes determining whether the first version value is lower than the highest version value. The method further includes, if the first version value is lower than the highest version value, updating the version value of the first device to the highest version value; and updating the first device to reference the at least two copies of the mirrored index data structure.

Yet another embodiment of the present disclosure relates to a distributed system that includes a plurality of storage units. The system further includes a balanced index tree configured to be organized by index values comprising a root node, a copy of the root node, a plurality of nodes, and a copy of the plurality of nodes. The system further includes a storage module configured to store the root node, the copy of the root node, the plurality of nodes, and the copy of the plurality of nodes stored among the plurality of storage units. The system further includes index tree data stored on each of the plurality of storage units referencing the root node and the copy of the root node.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Figure 1:
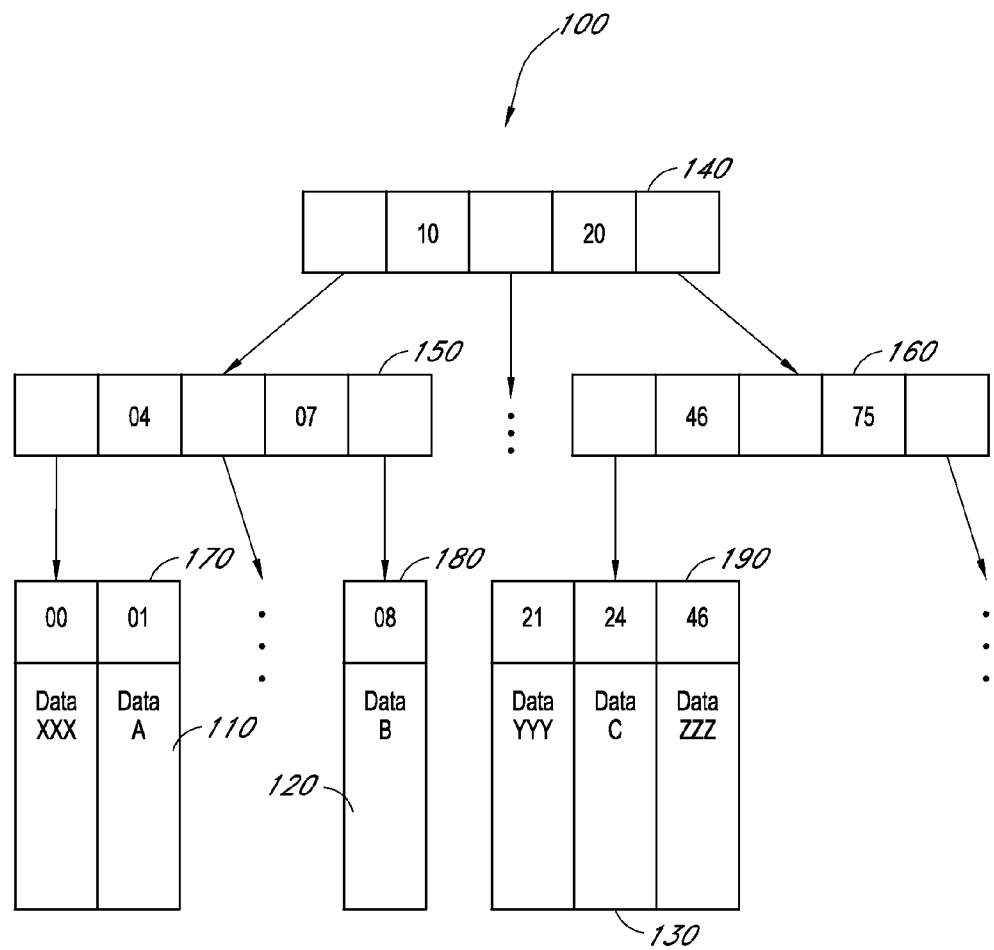
FIG. 1 illustrates one embodiment of a high-level block diagram of one embodiment of an index tree.

These and other aspects, advantages, and novel features of the present teachings will become apparent upon reading the following detailed description and upon reference to the accompanying drawings. The drawings and the associated descriptions are provided to illustrate embodiments of the invention and not to limit the scope of the invention. In the drawings, similar elements have may be marked with similar reference numerals.

DETAILED DESCRIPTION OF PREFERRED EMBODIMENTS

Systems and methods which represent various embodiments and example applications of the present disclosure will now be described with reference to the drawings.

For purposes of illustration, some embodiments will be described in the context of a distributed index tree and example environments in which a distributed index tree may be used are also disclosed. The inventors contemplate that the present invention is not limited by the type of environment in which the systems and methods are used, and that the systems and methods may be used in various environments, such as, for example, the Internet, the World Wide Web, a private network for a hospital, a broadcast network for a government agency, an internal network of a corporate enterprise, an intranet, a local area network, a wide area network, and so forth. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the appended claims.

I. Overview

The systems and methods of the present invention provide techniques for indexing data stored with varying protection levels. In one embodiment, the data is stored in a mirrored balanced tree, also referred to as an index tree, which indexes the data and stores it in the tree. Each leaf node represents a sorted group of the indexed data. Accordingly, when a modification is made to one node in the index tree, the same modification is made to other copies of that node. Similarly, when a node is added the index tree, the appropriate number of copies of the node are created and the parent node that references the new node includes references to each of the copies. Also, when a node is deleted from the index tree, references to all copies of the node are removed from the parent node.

In one embodiment, copies of the nodes of the mirrored index tree are distributed among a set of devices. Because copies of the nodes are stored on different devices, the index tree may tolerate the failure of one or more of the devices. When modifying nodes in the index tree, if the modification encounters a copy of node that is stored on a device that is unavailable, a new copy node is stored on an available device, and references to that node are updated to reflect its new location on the available device. In addition, when a device that was temporarily unavailable becomes available and attempts to rejoin the set of devices, that device is merged into the system and provided with references to the current copy of the index tree. Furthermore, the index tree may also be traversed to detect and restored any nodes that reside on unavailable devices by storing the nodes on available devices, and updating references to the restored nodes to reflect their new locations on the available devices.

II. Mirrored Index Tree

A. General Tree

To better understand the mirrored index tree, background information regarding an index tree is now described. FIG. 1 illustrates an example index tree 100 that includes three pieces of data, Data A 110, Data B 120, and Data C 130. Each of the pieces of data includes an index, namely 01, 08, and 24 respectively. FIG. 1 illustrates how the three pieces of data are stored in the tree. The top level of the tree includes two entries, 10 and 20, also referred to as keys or index entries. In some embodiments, the keys are of a fixed or variable size. In this example, if the data's index is less than or equal to 10, the data is stored off of the first branch of the tree; if the data's index is greater than 10 and less than or equal to 20, then the data is stored off of the second branch of the tree; if the data's index is greater than 20, then the data is stored off of the third branch of the tree. Thus, in this embodiment, a top level node 140, also referred to as a root node, covers all possible indexes. It is recognized that a variety of indexing techniques may be used wherein the top level covers other subsets of possible indexes, where other types of indexes are used (e.g., whole numbers, words, letters, etc.).

In FIG. 1, Data A's index is 01 which is less than or equal to 10 and less than or equal to 04. Thus, Data A is stored off of the first branch of internal node 150 on leaf node 170. Data B's index is 08 which is less than or equal to 10 and greater than 07. Thus, Data B is stored off of the third branch of internal node 150 on leaf node 180. Data C's index is 24 which is greater than 20 and less than or equal to 46. Thus, Data C is stored off of the first branch of internal node 160 on leaf node 190.

Index trees that are well known in the art include, for example, binary trees, B trees, B+ trees, B* trees, AVL trees, and so forth. Moreover, operations for searching, reading, updating, inserting nodes, deleting nodes, and balancing an index tree are well known to those of skill in the art.

B. Mirrored Tree

The systems and methods disclosed herein provide a protected index tree. In one embodiment, the nodes of the index tree are mirrored. One advantage of mirroring the nodes is that if one copy of a node is unavailable, then the other copy of the node may be used instead. In one embodiment, the entire index tree is mirrored the same number of times (e.g., all of the nodes are mirrored two times; all of the nodes are mirrored five times, etc.). In another embodiment, different nodes of the tree may have different levels of mirroring protection. For example, one node may be mirrored two times and another node may be mirrored five times. To maintain the protection level of the index tree, in this embodiment, a node of the index tree is stored using at least the same level of protection as the children that it references. For example, if a leaf node is mirrored two times, then any parent node referencing (e.g., pointing to) that leaf node is also mirrored at least two times.

Figure 2:
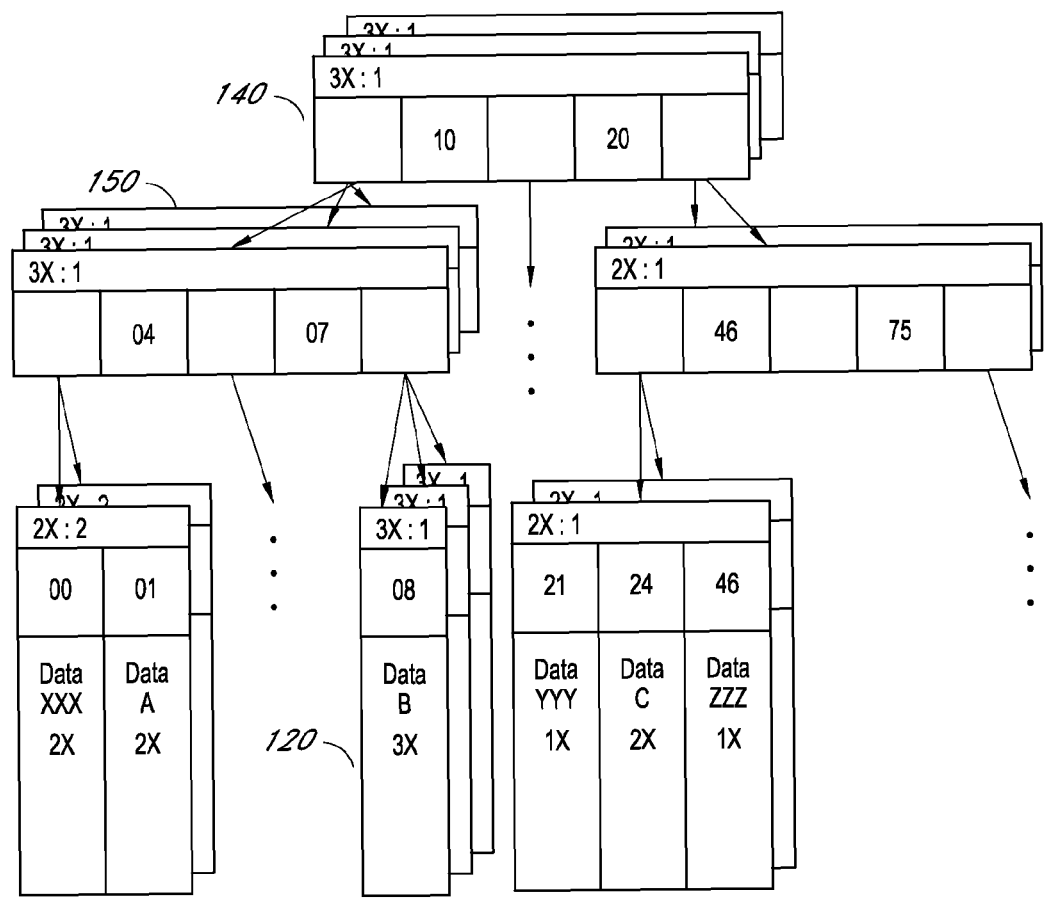
FIG. 2 illustrates one embodiment of a high-level block diagram of one embodiment of an index tree with varying levels of protection.

FIG. 2 illustrates one embodiment of the index tree of FIG. 1 where the index tree includes different mirroring levels, such that different nodes in the index tree are mirrored a different number of times. Fore example, Data B 120 is stored with a protection level of 3×. Accordingly, the branches of the index tree 140, 150 that lead to Data B 120 are also protected at a protection level of at least 3×.

C. Distributed Storage of the Mirrored Tree

In one embodiment, copies of a node are stored among a set of devices. For example, in FIG. 2, one copy of the root node 140 may be stored on a Device A, the second copy of the root node 140 may be stored on a Device B, and the third copy of the root node 140 may be stored on a Device C. Similarly, one copy of a leaf node 180 may be stored on Device B, the second copy of the leaf node 180 may be stored on Device C, and the third copy of the leaf node 180 may be stored on Device D. Accordingly, if one of the devices becomes unavailable (e.g., fails, crashed, becomes disconnected, is taken off line, etc.), then additional copies of the node may be retrieved from the other devices. For example, if Device B disconnects from Device A, Device C, and Device D, copies of the root node 140 are still available on Device A and Device C. Similarly, copies of the leaf node 180 are still available on Device C and Device D.

Figure 3A:
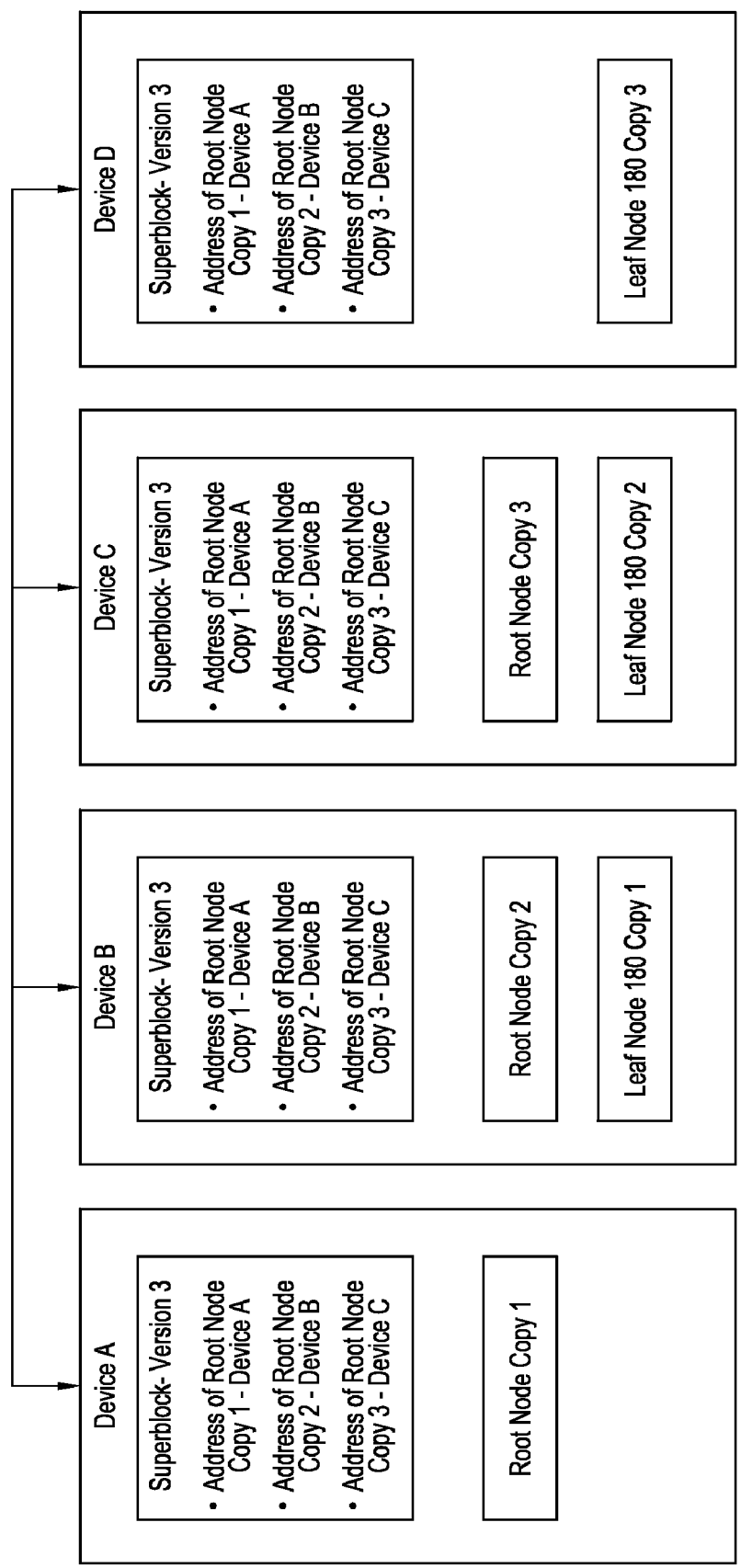
FIG. 3A illustrates one embodiment of a high-level block diagram of one set of devices A, B, C, and D that are in communication with each other.

In addition, in some embodiments, references to each copy of the root of the index tree are stored on each device. These references will be referred to as a superblock. FIG. 3A illustrates the set of Devices A, B, C, and D that are in communication with each other. Each device includes a superblock that provides the address of each copy of the root node as well as the version of the index tree referenced by the superblock. In the example above, the root node 140 is stored on Device A, Device B, and Device C. Accordingly, Device A, Device B, and Device C of FIG. 3 each have a copy of the root node 140. In the example above, the leaf node 180 is stored in Device B, Device C, and Device D. Accordingly, Device B, Device C, and Device D of FIG. 3 each have a copy of the leaf node 180. It is recognized that the address may be stored in a variety of formats using, for example, device number, address offsets, cylinder numbers, storage unit numbers, cache memory IDs, and so forth. In FIG. 3A, all four of the superblocks are shown as Version 3. Because they are all the same version, the superblocks, in this example, reference the same index tree.

Figure 3B:
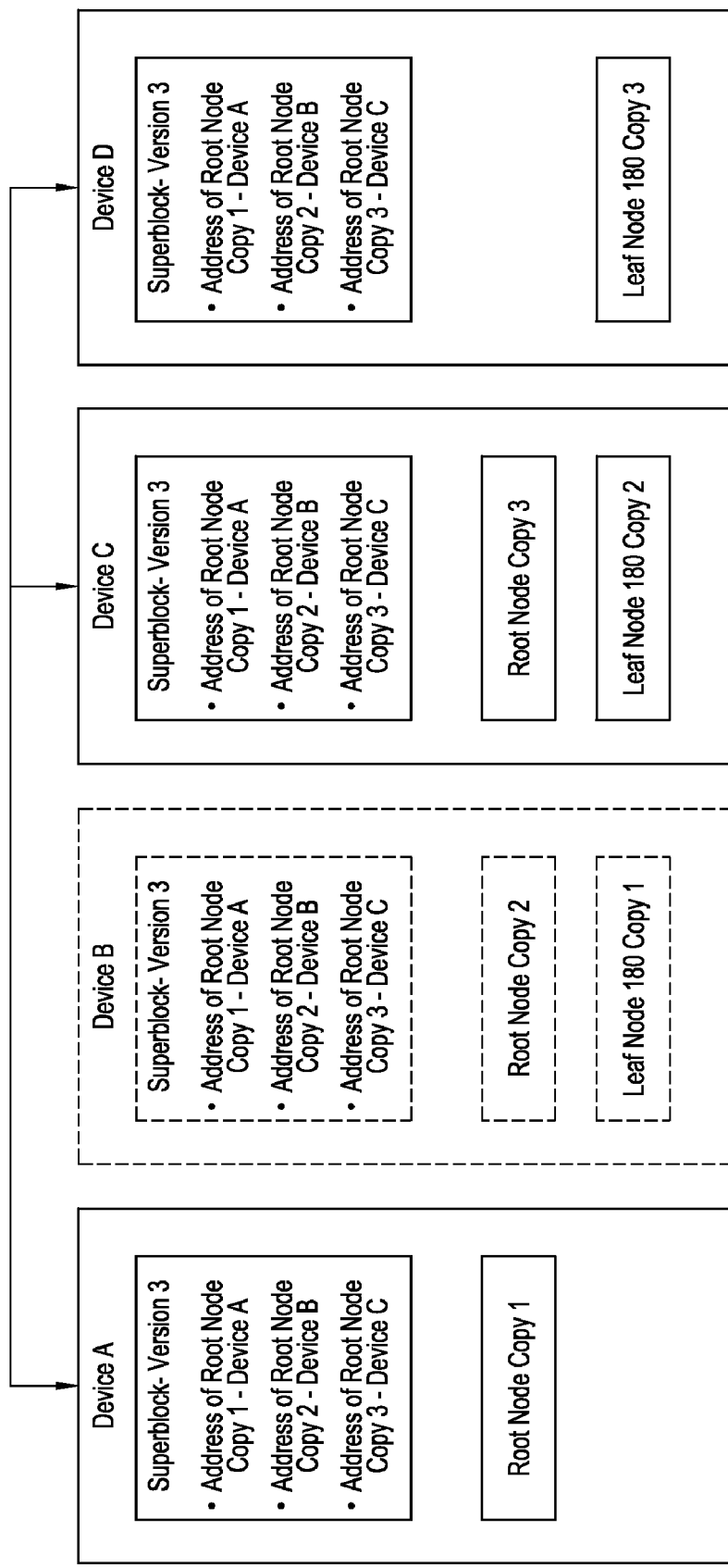
FIG. 3B illustrates one embodiment of a high-level block diagram of the set of devices A, B, C, and D of FIG. 3A where Device B has lost communication with the other devices.

FIG. 3B illustrates the example of when Device B becomes disconnected from Device A, Device C, and Device D, where copies of the root node 140 are still available on Device A and Device C. Similarly, copies of the leaf node 180 are still available on Device C and Device D.

Figure 3C:
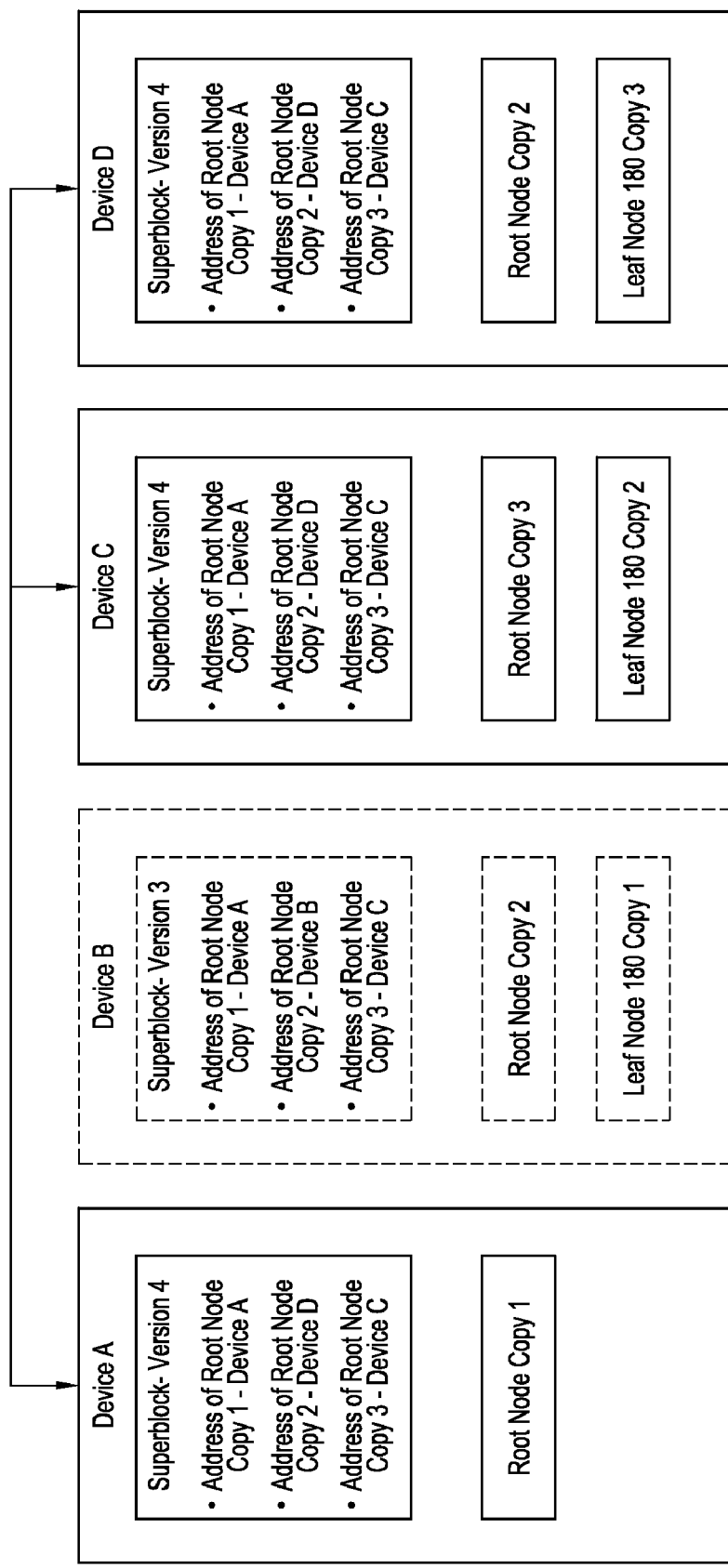
FIG. 3C illustrates one embodiment of a high-level block diagram of the set of devices A, B, C, and D of FIG. 3B where Device B has lost communication with the other devices and after a modify has taken place.

FIG. 3C illustrates the example of FIG. 3B after a modification has taken place where the modify operation created a new copy of the root node, to replace the copy of the root node that is not available on Device B. In FIG. 3C, the new copy of the root node is stored on Device D, the superblocks of the available devices, Device A, Device C, and Device D have been updated to reflect that copy 2 of the root node is located on Device D (and not Device B). In addition, the version of the superblocks of Device A, Device C, and Device D have been updated to a new version to reflect that a modification of the superblocks has taken place.

Figure 3D:
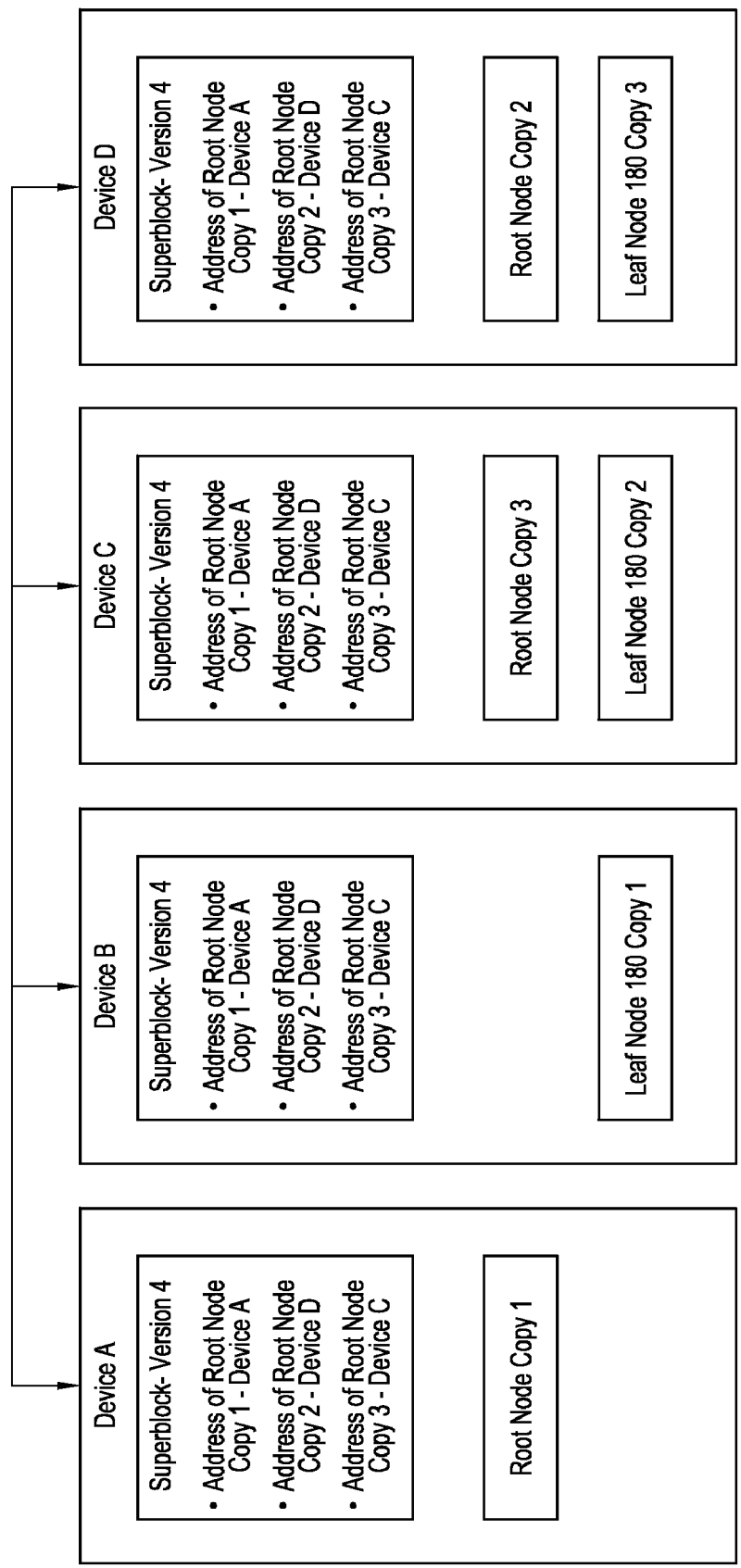
FIG. 3D illustrates one embodiment of a high-level block diagram of the set of devices A, B, C, and D of FIG. 3C where Device B has rejoined the set of devices.

FIG. 3D illustrates the example of FIG. 3A after Device B has come back online and merged back into the set of devices. Device B's superblock has been modified to reflect that copy 2 of the root node is located on Device D and to include the new version of the superblock. In addition, because the copy of the root node on Device B is no longer referenced, it has been removed from Device B. Also, in this example, there were no attempts to modify the leaf node 180 while Device B was offline. Accordingly, a copy of leaf node 180 remains on Device B.

D. Various Embodiments

In some embodiments, the index tree is implemented as a modified B*tree. As is well known by those of ordinary skill in the art, a B* tree is a search tree where every node has between $\lceil m/2 \rceil$ and m children, where m>1 is a fixed integer. Nodes are kept ⅔ full by redistributing the contents to fill two child nodes, then splitting them into three nodes. It may be advantageous to use a B* tree since the height, and hence the number of maximum accesses, can be kept small depending on m. As new nodes are added, the B* tree readjusts to keep the height of the tree below a maximum number. In some embodiments, the B* tree is further configured to have variable-sized records, that can be redundantly stored, splits insertion blocks once while they are being filled, and leaves behind a trail of blocks. It will be understood that, although some of the file and logical structures are described in terms of B-trees, various concepts of the present disclosure are not necessarily limited to B-tree applications. Moreover, it is recognized that a variety of data structures known to those of ordinary skill in the art may be used including, for example, other trees, graphs, linked lists, heaps, databases, stacks, and so forth.

Furthermore, in some embodiments, the index tree is protected using other protection schemes besides or in addition to mirroring. While mirroring is discussed herein, it is recognized that a variety of other protection/correction techniques may be used in addition to or instead of mirroring. For example, the nodes of the index tree may be protected using parity protection, for example, for nodes that are distributed among multiple devices. Moreover, the index tree may include nodes that are not mirrored at all.

It also is recognized that the term storage device may refer to a variety of devices including for example, a smart storage unit, a disk drive, a server, a non-volatile memory device, a volatile memory device, and so forth. Moreover, the storage device may be locally connected and/or remotely connected to one or more other devices. For example one smart storage unit may include multiple devices. Moreover, a storage device may include multiple memory units including one more volatile memory units and/or one or more non-volatile memory units.

III. Operations

Operations for reading, modifying, and restoring a distributed mirrored index tree are set forth below. In addition, an operation for merging in a device that was previously inaccessible is also disclosed.

A. Reading

To read data stored in the distributed mirrored index tree, a read process receives the requested data's index. The read process accesses one copy of the root node (e.g., using one of the references from the superblock), and based on the data's index and the keys in the root node, accesses one copy of the node in the next level of the distributed mirrored index tree. The read process then continues using the data's index and the keys in the nodes of the tree to access one copy of the node in the next level of the distributed mirrored index tree. Once the read processes accesses a copy of the leaf node, then the read processes uses the data's index to retrieve the data corresponding to that index.

Accordingly, if one copy of a node is on a disconnected device, then the read process attempts to access another copy of that node. The read process may be configured to request copies of nodes in a predetermined order based on the devices, to use a round robin technique based on which device was last used, a most recently used technique based on devices that were recently used, a "distance-based" technique placing a preference on local devices rather than remote devices, to use a random technique, and so forth.

B. Modifying

To modify data stored in the distributed mirrored index tree, a modify process receives a node to be modified, referred to as the target node. The modify process may also receive the modification that is requested (e.g., to update data, to update reference(s) to other nodes, to remove node, etc.). The modify process traverses the tree to the parent of the target node. The modify process then determines whether all of the copies of the target node are accessible. If so, then the modify process modifies all copies of the target node.

If one of the copies of the target node is not accessible (e.g., stored on a device that is not in communication with the other devices), then the modify process modifies the available copies of the target node, creates a new copy of the target node, stores the new copy on one of the available devices, and calls the modify process using the parent node.

Accordingly, the modify process then traverses the tree to the parent of the parent node, determines whether all copies of the parent node are accessible and if so, modifies all of the copies of the parent node to point to the new copy of the target node. If one of the copies of the parent node is not accessible, then the modify process modifies available copies of the parent node, creates a new copy of the parent node, stores the new copy of the parent node on one of the available devices, and calls the modify process of the parent's parent node (e.g., the grandparent of the target node).

This modify process continues up to the root node if changes to each of the parent nodes are necessary. In one embodiment, the root node acts as a special case since the address of each copy of the root nodes is stored on each device. If one of the copies of the root node are unavailable, then the modify process modifies available copies of the root node, creates a new copy of the root node, stores the new copy of the root node on one of the available devices, and then determines whether there are a quorum of devices that are available. If not, then the modify process does not update the superblocks to point to the new root node. If so, then the modify process modifies the superblocks to point to the new copy of the root node and updates the version of the superblocks.

The modify process 400 could also include removing nodes, where no changes are made to the target node and no copies of target nodes are made. Instead, the modify process 400 recursively updates the parent node of the node to be removed to reflect that the node has been removed. In other embodiments, the modify process 400 could replace the node to be removed with one more good copies of the node.

Figure 4A:
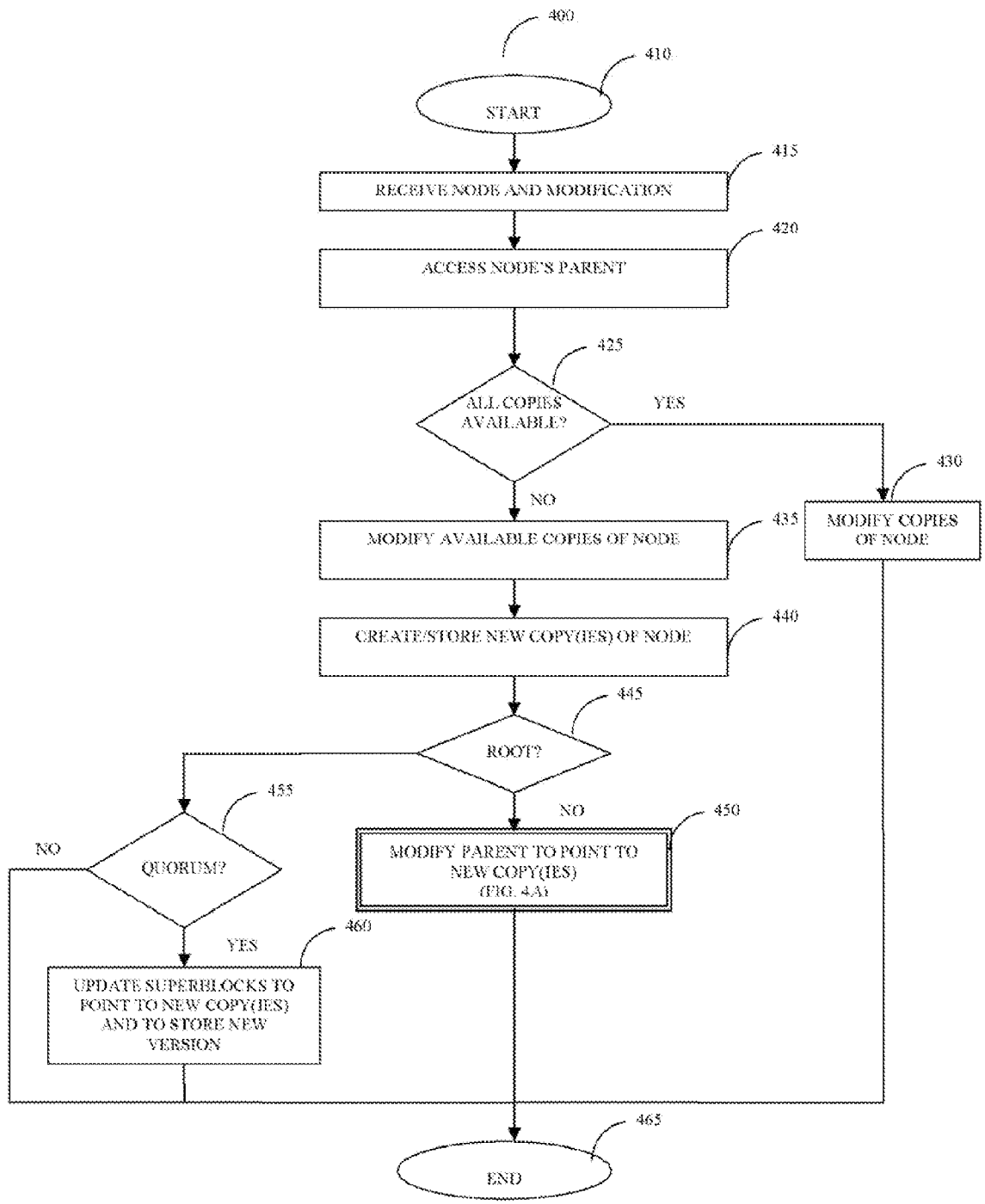
FIG. 4A illustrates one embodiment of a flow chart of a modify process.

One example of a modify process 400 is illustrated in FIG. 4A. Beginning in a start state 410, the modify process 400 proceeds to block 415. In block 415, the modify process 400 receives a node and a requested modification to the node. The node may be identified using a variety of techniques such as, for example, an identifier, a name, a path, and so forth. In addition, the modification may include, for example, modifying data stored in a leaf node, modifying pointers to children nodes, removing the node from the index tree, and so forth. Proceeding to the next block 420, the modify process 400 accesses the node's parent node. In this example, the parent node is the node that references the node, and the parent of the root node is the superblock. Proceeding to block 425, the modify process 400 determines whether all copies of the node are available. For example, a copy of the node would not be available if the copy was stored on a device that is down. If all copies are available, then the modify process 400 modifies all copies of the node with the requested modification 430 and proceeds to an end state 465. If all copies are not available, the modify process 400 modifies all available copies of the node with the requested modification 435, creates and stores a new copy of the node (or more than one copy if more than one copy is not available) 440 on an available device. It is recognized that if none of the copies are available, the modify process 400 may terminate and return an error.

Proceeding to block 445, the modify process 400 determines whether the node is the root node. If the node is not the root node, then the modify process 400 proceeds to block 450; if the node is the root node, then the modify process 400 proceeds to block 455.

In block 450, the modify process 400, recursively calls the modify process to modify the parent node to point to the new copy (or copies) of the node, and proceeds to the end state 465.

In block 455, the modify process 400 determines whether there is quorum of available devices. In one embodiment, the quorum is a majority of the devices, but it is recognized that in other embodiments, other subsets of the number of devices could be used. If there is not a quorum, then the modify process 400 proceeds to the end state 465. In some embodiments, the modify process 400 may return an error indicating that less than a quorum of the devices are available. If there is a quorum, the modify process 400 proceeds to block 460 and updates the superblocks to point to the new copy (or copies) of the root. In some embodiments, the modify process 400 also updates the superblock to store a new version. It is recognized that in some embodiments, the modify process 400 does not update the superblocks, but sends out commands for each of the devices to update their superblocks and/or to update their versions.

Figure 4B:
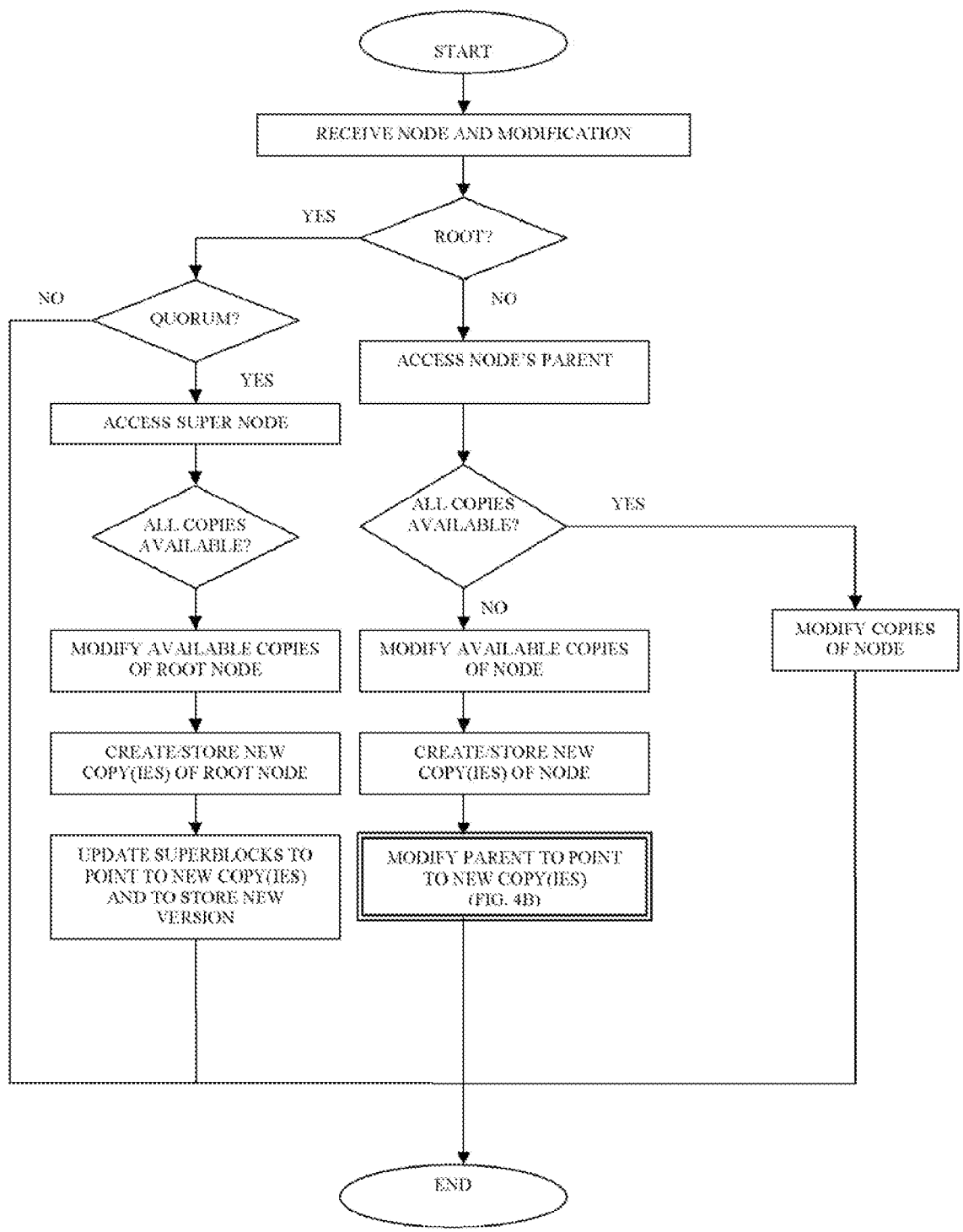
FIG. 4B illustrates an additional embodiment of a flow chart of a modify process.

It is recognized that other embodiments of a modify process 400 may be used. FIG. 4B illustrates an additional embodiment of a modify process 400 that prevents any updating of the root nodes if there is not a quorum. FIGS. 4A and 4B illustrate various embodiments of the modify process 400.

C. Restoring

To restore data stored in the distributed mirrored index tree, a restore process traverses the distributed mirrored index tree to find copies of nodes that are stored on unavailable devices and to restore those copies.

The restore process begins with a copy of the superblock and determines whether all copies of the root node are available. If so, then the superblock retrieves one copy of the root node and determines whether all copies of each of the root nodes' children are available. If not, then the restore process determines whether there is quorum of available devices. If there is not a quorum, the restore process terminates. If there is a quorum, then the restore process creates and stores a new copy of the missing root node on one of the available devices, and updates the superblocks on all of the available devices to reference the newly created copy of the root node and to update the superblocks' version.

Next, the restore process proceeds to the next level of the tree, and determines whether all copies of the root's children nodes are available. If not, then the restore process creates and stores missing copies of the root's children. The restore process then proceeds to restore children of the root's children. The restore process continues this for each level of the tree until all nodes, including the leaf nodes, have been traversed.

1. Restore Tree Process

Figure 5:
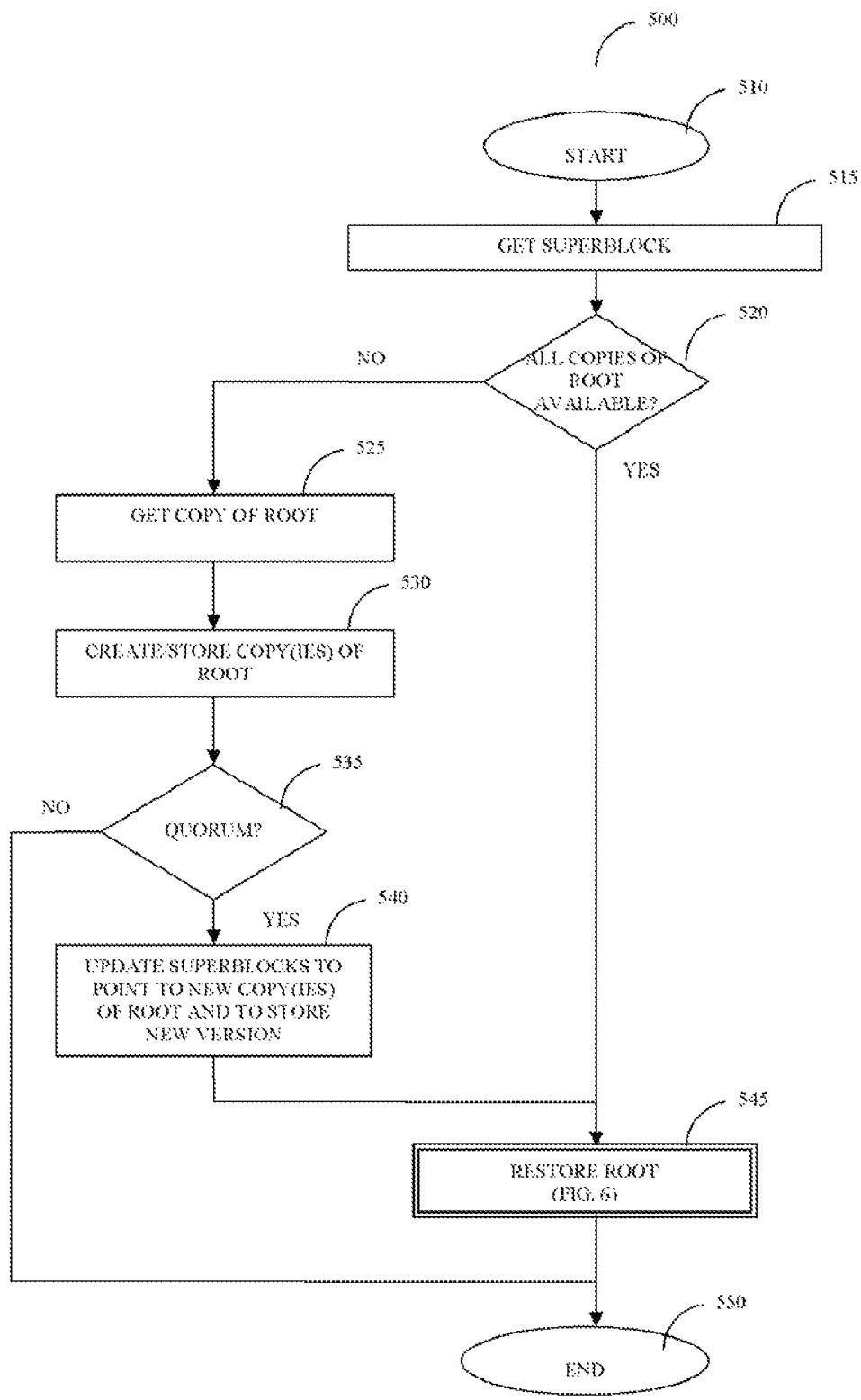
FIG. 5 illustrates one embodiment of a flow chart of a restore tree process.

One example of a restore tree process 500 is illustrated in FIG. 5. Beginning in a start state 510, the restore tree process 500 proceeds to the next block 515. In block 515, the restore tree process 500 obtains a copy of the superblock. Proceeding to the next block 520, the restore tree process 500 determines whether all copies of the root node are available. If so, then the restore tree process 500 proceeds to block 545. If not, then the restore tree process 500 proceeds to block 525.

In block 525, the restore tree process 500 obtains a copy of the root node. It is recognized that if none of the copies are available, the restore tree process 500 may terminate and/or return an error. In block 530, the restore tree process 500 creates and stores a new copy of the root node (or more than one copy if more than one copy is not available). The restore tree process 500 then determines whether there is quorum of available devices. If there is not a quorum, then the restore tree process 500 proceeds to the end state 550. In some embodiments, the restore tree process 500 may return an error indicating that less than a quorum of the devices is available. If there is a quorum, the restore tree process 500 proceeds to block 540 and updates the superblocks to point to the new copy (or copies) of the root node. In some embodiments, the restore tree process 500 also updates the superblock to store a new version. It is recognized that in some embodiments, the restore tree process 500 does not update the superblocks, but sends out commands for each of the devices to update their superblocks and/or to update their versions. The restore tree process 500 then proceeds to block 545.

In block 545, the restore tree process 500 calls a restore node process 600 to restore the root node. In some embodiments, the restore node process 600 is passed the copies of the root node or references to the copies of the root node.

2. Restore Node Process

Figure 6:
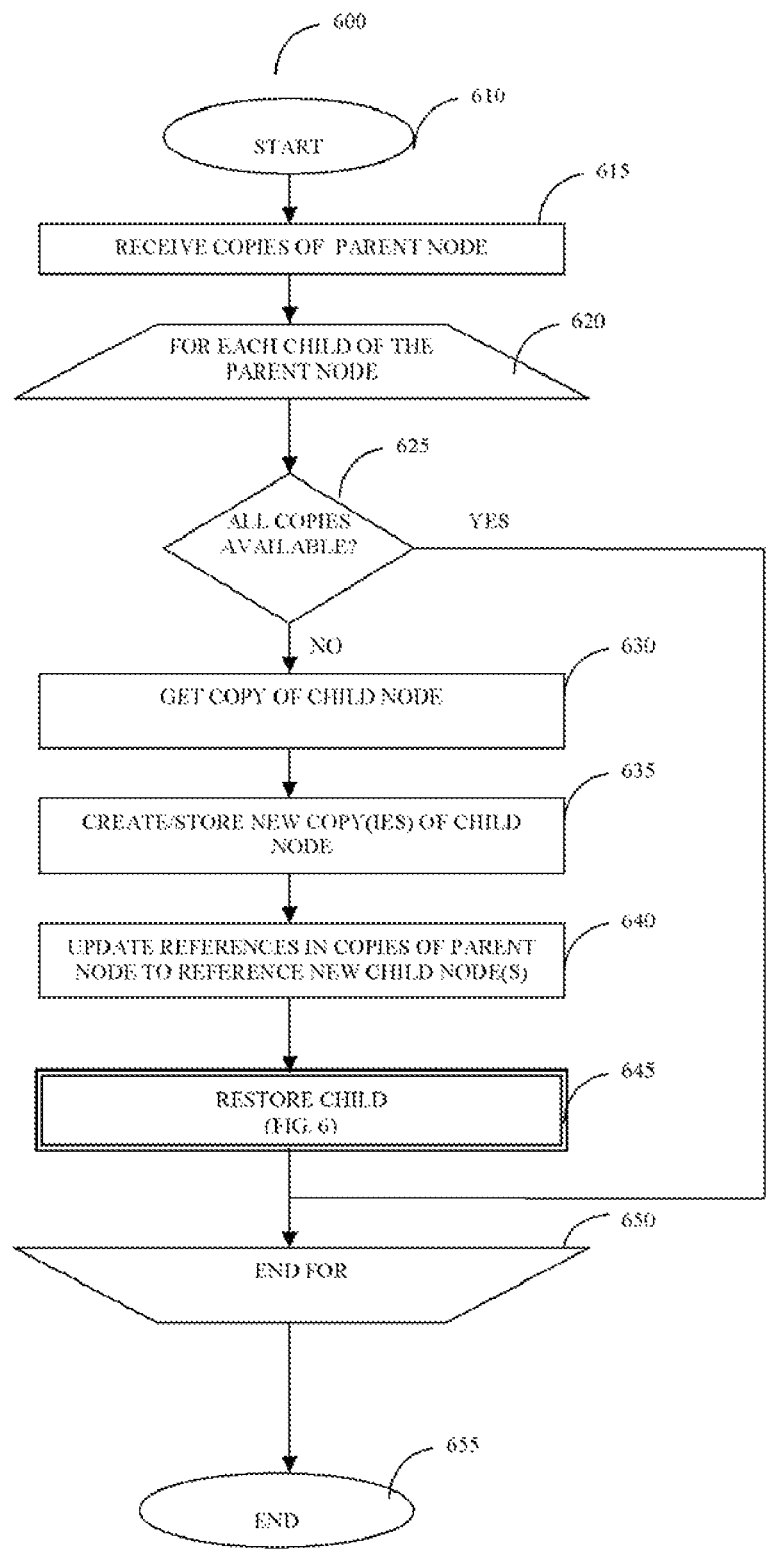
FIG. 6 illustrates one embodiment of a flow chart of a restore node process.

One example of a restore node process 600 is illustrated in FIG. 6. Beginning in a start state 610, the restore node process 600 proceeds to the next block 615. In block 615, the restore node process 600 obtains copies of or receives copies of a parent node (or references to the node). For each child of the parent node 620, 650, the restore node process 600 determines whether all copies of the child node are available. If so, then the restore node process 600 proceeds to the next child 620, 650. If not, then the restore node process 600 proceeds to block 630.

In block 630, the restore node process 600 obtains a copy of the child node. It is recognized that if none of the copies are available, the restore node process 600 may terminate and/or return an error. In block 635, the restore node process 600 creates and stores a new copy of the child node (or more than one copy if more than one copy is not available). Proceeding to the next block 640, the restore node process 600 updates the copies of the parent node to point to the new copy (or copies) of the child node. Proceeding to the next block 645, the restore node process 600 calls a restore process to restore the child node.

In some embodiments, the restore process is passed the copies of the child node or references to the copies of the child node. Once the children of the parent node have been traversed and the children nodes have been restored, then the restore node process 600 proceeds to an end state 655.

It is recognized that the tree may be traversed in a variety of manners and that in other embodiments the tree may be traversed starting with the leaf nodes and/or the tree may be traverses level by level. FIGS. 5 and 6 are meant only to illustrate example embodiments of a restore process.

D. Merging

The distributed mirrored index tree may also be used to merge in new devices that were temporarily unavailable, but that have now become available. When a device comes back online, the device may need to access the distributed mirrored index tree. However, the device may have invalid references to copies of the root node of the distributed mirrored index tree. For example, while the device was offline, one of the copies of the root node may have been stored on the down device and may have been modified using the modify process above. Accordingly, a new copy of the root node, with the modified data may have been created and updated and stored on an available device. In addition, the superblocks' references to copies of the root node may have been modified to reference the new copy of the root node instead of the copy that was stored on the down device.

A merge process may be used to compare the version of a device's superblock with versions of the other devices. If the version is the same, then the device's superblock is current. If the device's version is lower than the versions of the other devices, then the device's superblock is updated to point to the same copies of the root node as devices with the highest version. In addition, the device's superblock device is updated to the highest version.

Figure 7:
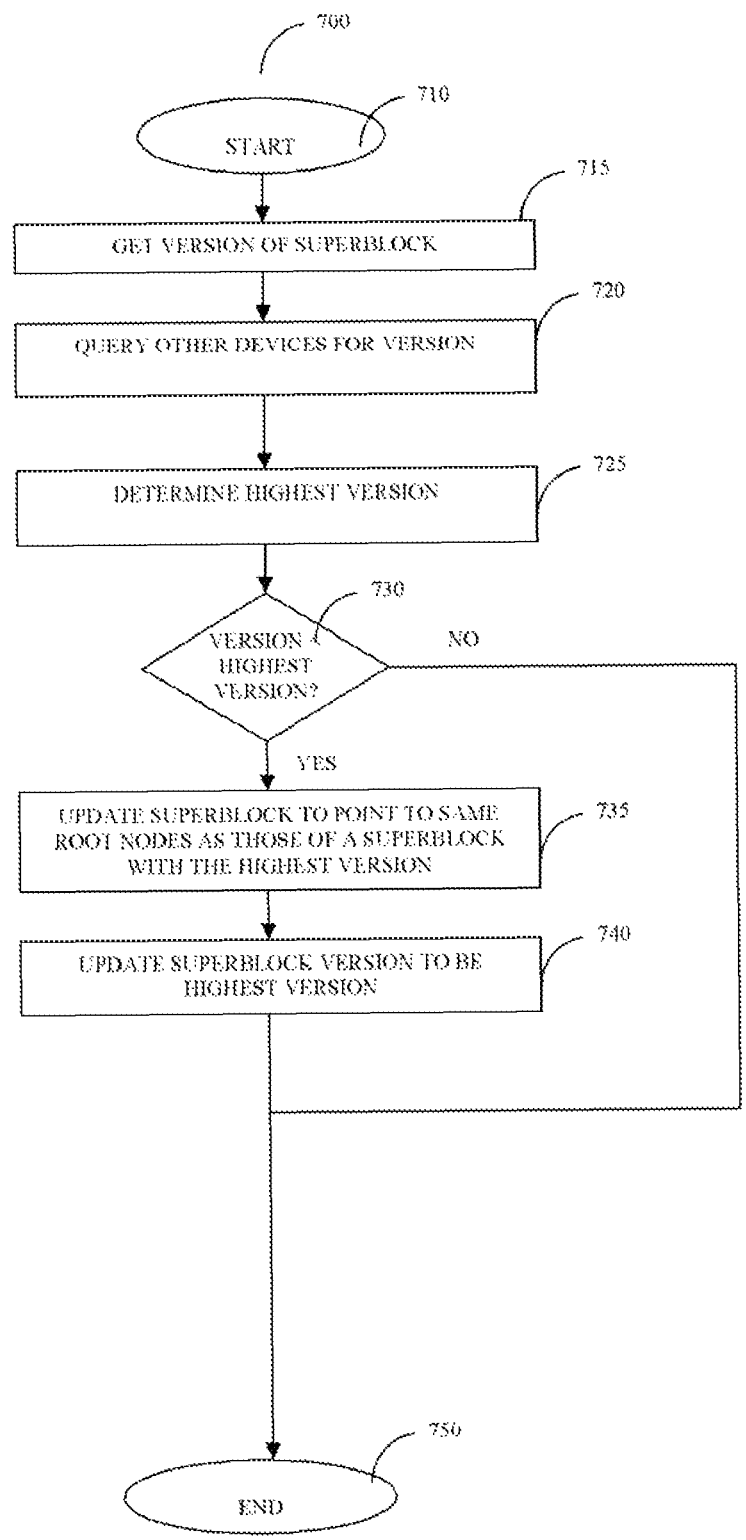
FIG. 7 illustrates one embodiment of a flow chart of a merge process.

One example of a merge process 700 is illustrated in FIG. 7. Beginning in a start state 710, the merge process 700 proceeds to block 715. In block 715, the merge process 700 obtains the version of the superblock for the device that is merging into the set of other devices. Proceeding to the next block, 720, the merge process 700 queries the other devices for the versions in their superblocks. Proceeding to the next block 725, the merge process 700 determines the highest version. In other embodiments, the merge process may also determine whether there is a quorum of nodes that have the highest version. If not, then the merge process 700 may return an error.

Proceeding to the next block 730, the merge process 700 determines whether the device's version is less than the highest version. If not, then the merge process 700 proceeds to an end state 750. If so, then the merge process updates the device's superblock to point to the same copies of the root node as pointed to by a superblock with the highest version 735. Proceeding to the next block 740, the merge process 700 updates the superblock's version to the highest version.

The version may be represented using a variety of techniques such as, for example, an integer, a decimal, a letter, a word, and so forth.

FIG. 7 illustrates one embodiment of a merge process 700 and it is recognized that other embodiments of a merge process 700 may be used.

IV. Distributed System

Figure 8A:
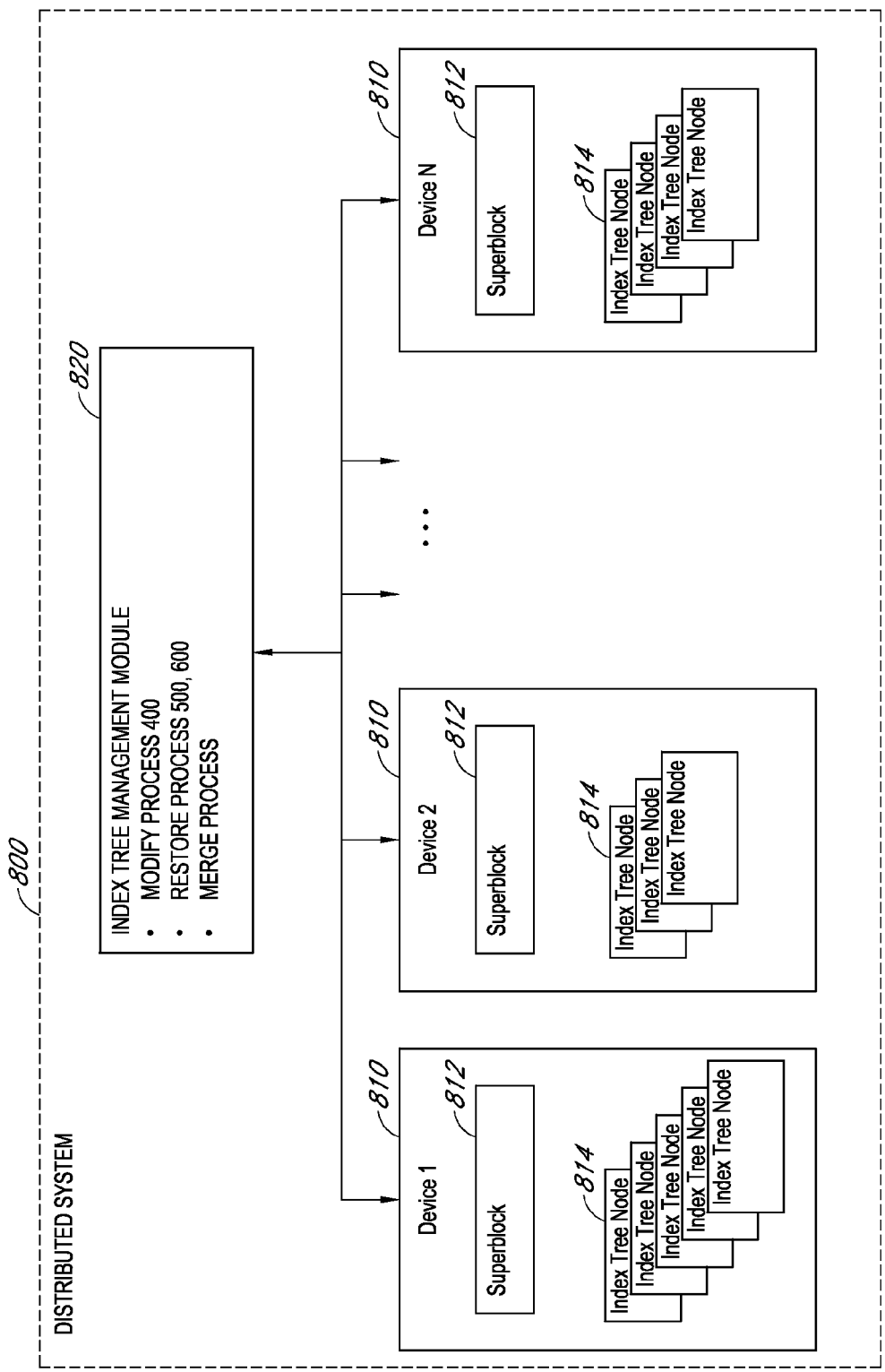
FIG. 8A illustrates one embodiment of a block diagram of a distributed system.
Figure 8B:
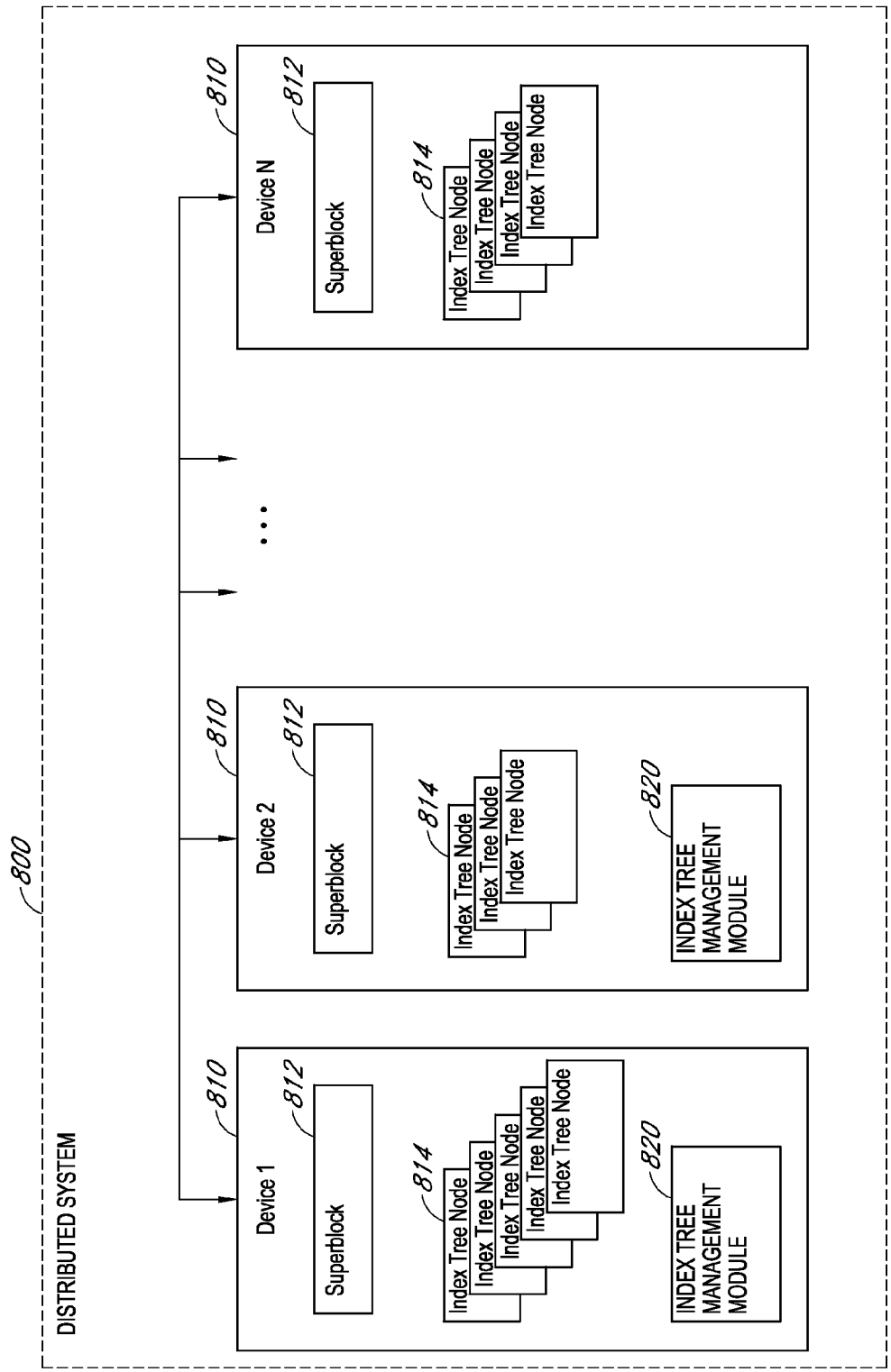
FIG. 8B illustrates another embodiment of a block diagram of a distributed system.

FIG. 8A illustrates one embodiment of a distributed system 800 having an index tree management module 820 in communication with a set of devices 810. It is recognized that the index tree management module 820 may be located apart from the set of devices 810 and/or may be located on one or more of the devices 810, as illustrated in FIG. 8B. In other embodiments, the index tree management module 820 may be spread among one or more of the devices 810.

The index tree management module 820 and the devices 810 may communicate using a variety of communication techniques that are well known in the art. Such communication may include local communication, remote communication, wireless communication, wired communication, or a combination thereof.

The exemplary devices include a superblock 812 as well as a set of index tree nodes 814. As illustrated each device may include a different number of index tree nodes or may include the same number of index tree nodes. The superblock and/or index tree nodes may be stored on disks or other non-volatile memory on the device 810 and/or in RAM or other volatile memory on the device 810. The distributed system 800 is not limited to a particular type of memory. In addition, the distributed system 800 may include devices that do not include any superblocks and/or any index tree nodes.

In some embodiments, the distributed system 800 may be accessible by one or more other systems, modules, and/or users via various types of communication. Such communication may include, for example, the Internet, a private network for a hospital, a broadcast network for a government agency, an internal network of a corporate enterprise, an intranet, a local area network, a wide area network, and so forth. It is recognized that the distributed system 800 may be used in a variety of environments in which data is stored. For example, the distributed system 800 may be used to stored records in a database, content data, metadata, user account data, and so forth.

It is also recognized that in some embodiments, the systems and methods may be implemented as a single module and/or implemented in conjunction with a variety of other modules and the like. Moreover, the specific implementations described herein are set forth to illustrate, and not to limit, the present disclosure.

V. Sample Index Tree Nodes

Figure 9A:
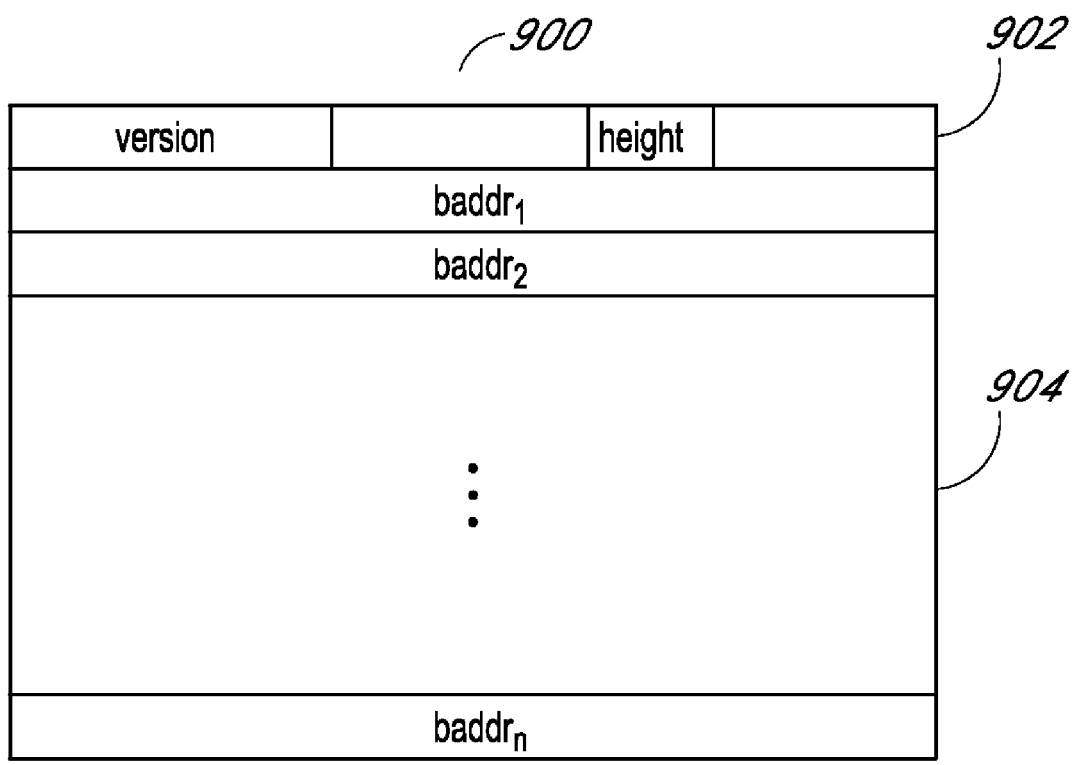
FIG. 9A illustrates one embodiment of a superblock.
Figure 9B:
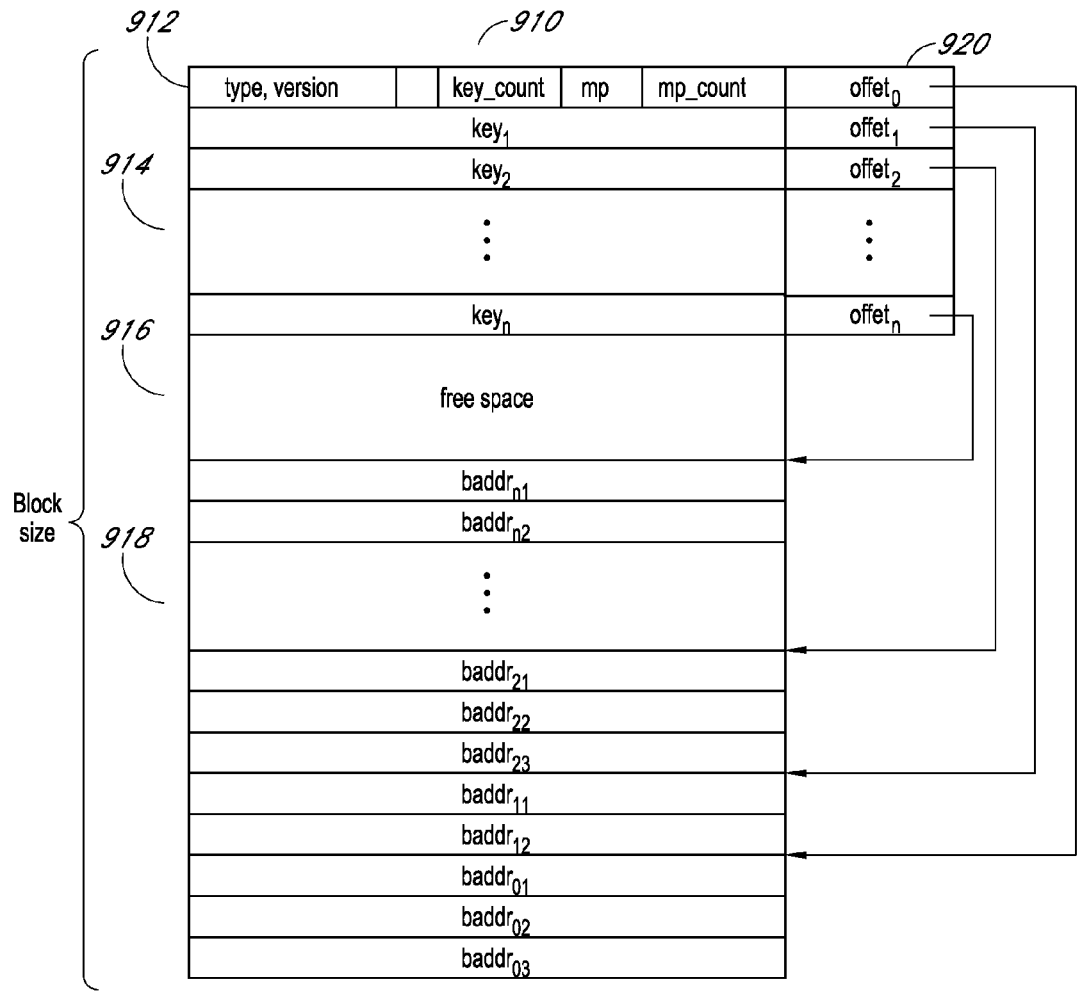
FIG. 9B illustrates one embodiment of an inner node.
Figure 9C:
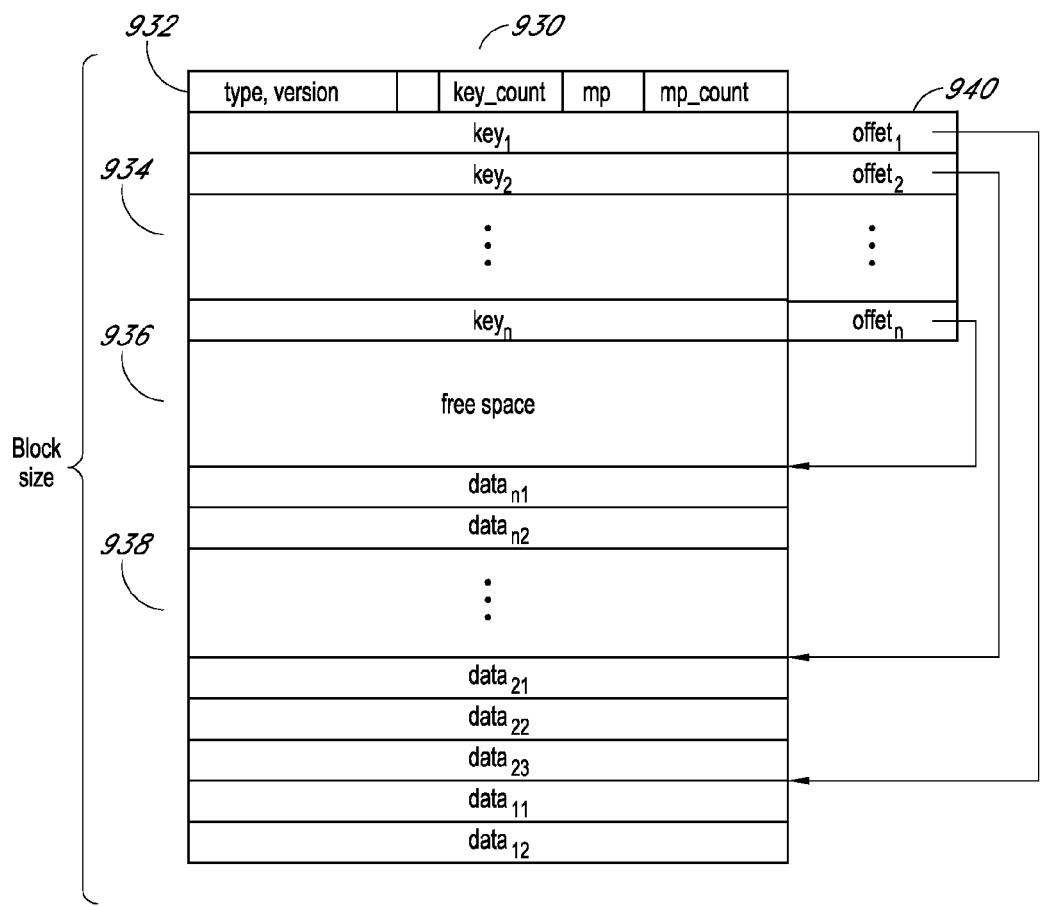
FIG. 9C illustrates one embodiment of a leaf node.

FIGS. 9A, 9B, and 9C illustrate example embodiments of a superblock 900, an inner node 910, and a leaf node 930. In various embodiments, these nodes can have redundant copies in a manner described herein.

A. Superblock

FIG. 9A illustrates one embodiment of a superblock 900 that can be configured to provide, among others, the functionality of pointing to the copies of the root node for an index tree. In one embodiment, the superblock 900 points to an index tree by pointing to (e.g., storing the device number and address of) copies of the root node. The exemplary superblock 900 includes a header section 902, followed by a listing of pointers 904 to the one or more copies of the root node. The exemplary list of pointers includes $baddr_1$ to $baddr_N$. Thus, the pointer $baddr_1$ points to the first copy of the root node, baddr$_2$ to the second copy of the root node, and so on. In one embodiment, unused pointers are stored as zeroes or NULL values and placed at the end of the listing 904. For example, if the superblock 200 points to two copies of a root node, then the pointers baddr$_1$ and baddr$_2$ would be positioned at the beginning of the listing 904, and the remainder of the listing 904 would be zeroed out.

In other embodiments, the superblock 900 may be configured to point to more than one index tree.

As further shown in FIG. 9A, the header section 902 can include version information that indicates how current the index tree is (e.g., version information). The header section 902 can also include information about the height of the index trees that are pointed to by the pointers 904. A height of zero indicates that the superblock 900 does not point to any index tree. A height of one indicates that the superblock 900 points directly to copies of leaf blocks (e.g., there are no inner blocks). A height of n>1 indicates that there are n−1 levels of inner blocks. It is recognized that the superblock 900 may include additional and/or other data such as, for example, the name of the index tree(s), the date the superblock 900 was last updated, the number of devices required for a quorum, the date the superblock 900 was created, permission information indicating which devices and/or users have permission to read, write, or delete the superblock 900, and so forth.

As set forth above, in one embodiment, a copy of the superblock 900 is stored on each device of the distributed system.

B. Inner Node

FIG. 9B illustrates one embodiment of an inner node 910 that includes a header section 912 followed by a listing of index entries 714 (shown as key$_1$, key$_2$, . . . , key$_n$) and related offset values 920. The offset values 920 point to pointer entries 918 that relate to the index entries 914. The pointer entries 918 point to leaf nodes or to another level of inner nodes.

Inner nodes 910 provide mappings to values between index entries 914 using pointer entries 918. For example, offset$_0$ points to the address of the node for values less than key$_1$; offset$_1$ points to the address of the node for index entries greater than or equal to key$_1$ and less than key$_2$; offset$_2$ points to the address of the node for index entries greater than or equal to key$_2$ and less than key$_3$; and so forth.

The number of pointer entries for each offset depends on the number of mirrored copies of that node. For example, if child node is mirrored two times, then any offset pointing to that node will have at least two pointer entries related to that offset. Similarly, if a child node is mirrored three times, then any offset pointing to that node will have at least three pointer entries related to that offset. In the exemplary inner node 910, offset$_0$ points to baddr$_{01}$, baddr$_{02}$, and baddr$_{03}$ signifying that there are three copies of the child node located at baddr$_{01}$, baddr$_{02}$, and baddr$_{03}$; the node is mirrored three times (3×). Similarly, offset$_{01}$ points to baddr$_{11}$ and baddr$_{12}$ signifying that there are two copies of the second child node located at baddr$_{11}$ and baddr$_{12}$; that node is mirrored two times (2×). Accordingly, the inner nodes provide information as to where copies of their children nodes are stored.

In one embodiment, the index entries 914 and the offsets 920 are arranged in an increasing order beginning from the top of the inner node 910. The pointer entries 918 corresponding to the offsets 920 are arranged beginning from the bottom of the inner node 910. Thus, a free space 916 can exist between the index entries 914 and the pointer entries 918. Such an arrangement and the free space 916 provide for easy addition of new index entries 914. For example, if key$_{n+1}$ is to be added, it can be inserted below the last entry (key$_n$) of the index entries 914. A corresponding pointer entry can then be inserted above the last entry. The free space 916 accommodates such addition, and the existing index entries and the pointer blocks are not disturbed. This embodiment allows referenced nodes to be protected at different levels allowing for the addition of multiple pointer entries 918 for each offset 220. In addition, it allows the index tree to be rebalanced such that if additional index entries 214 are needed to balance the tree, then they can be added.

As further shown in FIG. 9B, the header 912 can include information similar to that of the inner node 910 discussed above. The header 912 can also indicate the number of index entries 914 (e.g., key_count). The header 912 can also indicate the maximum protection "mp" (the maximum redundancy) for the index entries 214 (and the corresponding pointer entries). The header 912 can also indicate how many (e.g., mp_count) index entries (e.g., child nodes) have the maximum protection. In other embodiments, the header 912 may also include information about the protection level of each of the child nodes in addition to or instead of the maximum protection level. In other embodiments, the header 912 may include information about a subset of the protection levels and counts related to those protection levels. The information about the maximum protection and the count that can be used allow for variable protection in the index tree as disclosed in U.S. Patent Application entitled "Systems and Methods for Providing Variable Protection in an Indexing System," filed concurrently herewith, which is hereby incorporated by reference herein in its entirety.

Moreover, it is recognized that the inner nodes 910 may include additional and/or other data, such as, for example, the date the inner node 910 was last updated, the date the inner node 910 was created, permission information indicating which devices and/or users have permission to read, write, or delete the inner node 910, and so forth. It is also recognized that the information discussed above may be stored in the header 912 or in other areas of the inner node 910.

In one embodiment, the inner node 910 as a whole constitutes a fixed amount of data. Thus, the foregoing arrangement of the index entries 914 and the pointer entries 918, in conjunction with the free space 916, allows for addition of new data without altering the existing structure. In one embodiment, the inner node 910 is 8 kB in size. It is recognized, however, that the inner node may be of a variety of sizes.

C. Leaf Node

FIG. 9C illustrates one embodiment of the leaf node 930 having a header 932 and a listing of leaf index entries 934. The leaf index entries 934 (key$_1$, key$_2$, . . . , key$_n$) have corresponding offsets 940, and are arranged in a manner similar to that of the inner node 910 described above. In one embodiment, the leaf nodes 930 are at the bottom level of the tree, with no lower levels. Thus, the offsets 940 for the leaf index entries 934 points to data 938 for the corresponding index entry 934. The exemplary leaf node includes n index entries 934, where key$_1$ corresponds to offset$_1$, which points to two copies of the data that correspond to key$_1$, where the two copies of the data are stored at data$_{11}$ and data$_{12}$. The index entries may correspond to a variety of data. For example, the data 938 may include records in a database, user account information, version data, metadata, addresses to other data, such as metadata data structures for files and directories of the distributed file system, and so forth. For example, offset$_1$ points to the address block having example two copies of the data (data$_{11}$ and data$_{12}$), which may be, for example, two copies physical addresses of a metadata structure for a file that is distributed within the distributed system.

In one embodiment, the arrangement of the leaf index entries 934 and the data 938, with a free space 936, is similar to that of the inner node 910 described above in reference to FIG. 9B. The header 932 may also include similar information as that of the inner node 910.

In one embodiment, the leaf block 930 as a whole constitutes a fixed amount of data. In one embodiment, the leaf block 930 is 8 kB in size. It is recognized, that the leaf block 930 may be a variety of sizes.

IV. Example Environments

The following provides example environments in which a distributed mirrored index tree may be used. It is recognized that the systems and methods disclosed herein are not limited to such example environments and that such examples are only meant to illustrate embodiments of the invention.

A. Employee Database System

Figure 10:
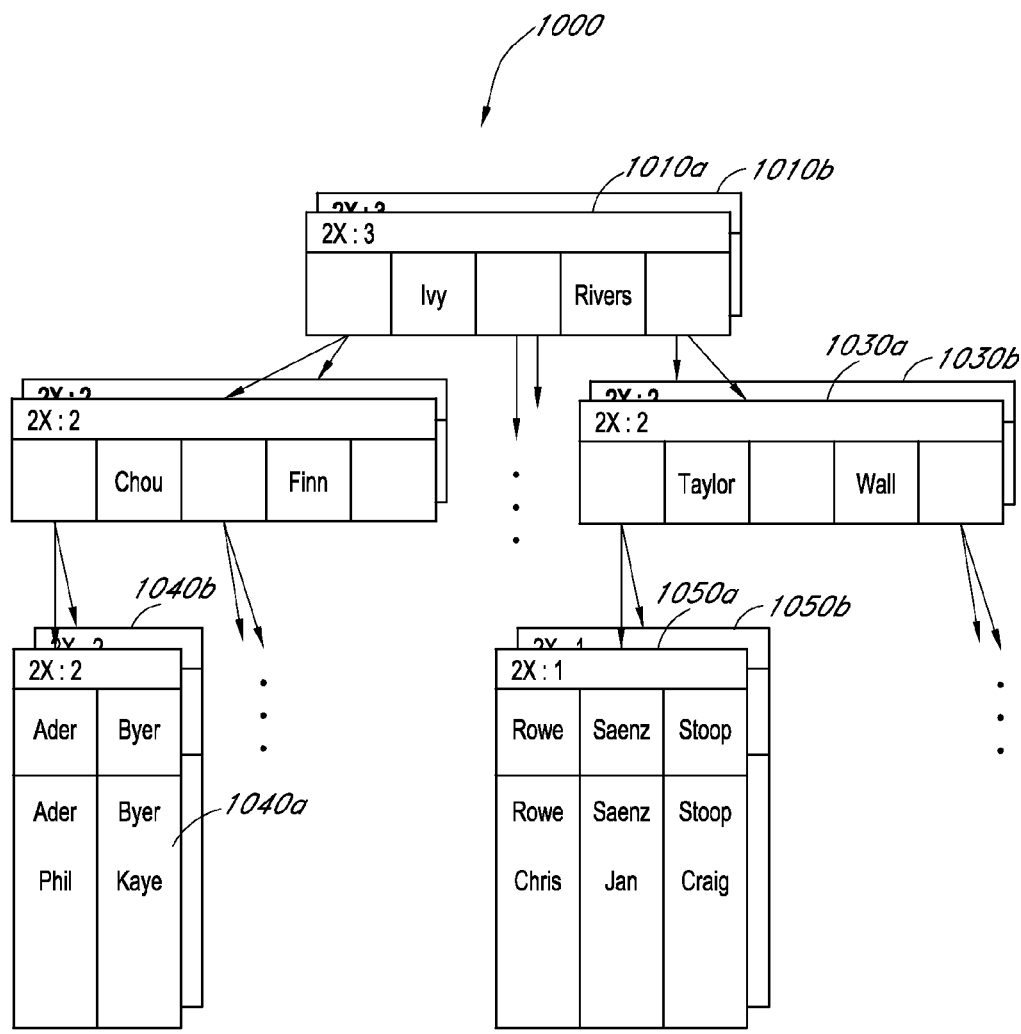
FIG. 10 illustrates one embodiment of a high-level block diagram of one embodiment of an index tree used to store database records.

FIG. 10 illustrates an example distributed mirrored index tree 1000 for storing employee database records, where the records are sorted by last name. For example, the index value for employee Phil Ader is "Ader" and the index value for Jan Saenz is "Saenz." The exemplary index tree 1000 includes nodes that are mirrored two times.

As an example, if a request to modify Kaye Byer's name to be "Kay" instead of "Kaye," following the modify process disclosed herein, the modify process 400 would obtain a copy of node 1020*a* or 1020*b* and determine whether both 1040*a* and 1040*b* were on live devices. If, for example, 1040*b* was stored on a failed device, the modify process 400 would make the change to 1040*a*, copy the modified 1040*a* to create a new copy of 1040*b* stored on an available device, and then check to see if 1020*a* and 1020*b* were both on live devices. If so, then the modify process 400 would update the pointers in 1020*a* to point to the new 1040*b* and update the pointers in 1020*b* to point to the new 1040*b*.

Figure 11:
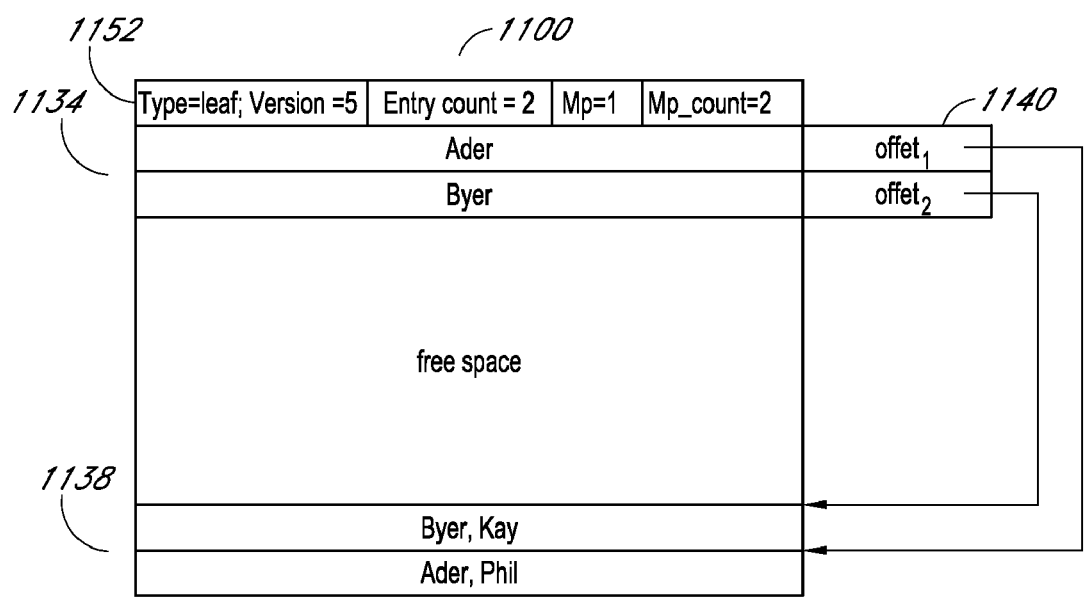
FIG. 11 illustrates one embodiment of a leaf node used to store database records.

FIG. 11 illustrates an example leaf node 1100 that corresponds to node 1040*a*. The exemplary leaf node 1100 includes a header 1152 noting that the node is a leaf node, the node is version 5, the number of entries is 2, the maximum protection is 1x, and the number of entries is 2. The entries 1134 include Ader and Byer whose corresponding offsets 1140 point to the respective data values "Ader, Phil" and "Byer, Kay" 1138.

B. Intelligent Distributed File System

As another example, in one embodiment, the systems and methods may be used with an intelligent distributed file system as disclosed in U.S. patent application Ser. No. 10/007,003, issued as U.S. Pat. No. 7,685,126 on Mar. 23, 2010, titled "SYSTEM AND METHOD FOR PROVIDING A DISTRIBUTED FILE SYSTEM UTILIZING METADATA TO TRACK INFORMATION ABOUT DATA STORED THROUGHOUT THE SYSTEM," filed Nov. 9, 2001, which claims priority to Application No. 60/309,803 filed Aug. 3, 2001, which is hereby incorporated by reference herein in its entirety.

In one embodiment, the intelligent distributed file system uses metadata data structures to track and manage detailed information about files and directories in the file system. Metadata for a file may include, for example, an identifier for the file, the location of or pointer to the file's data blocks as well as the type of protection for each file, or each block of the file, the location of the file's protection blocks (e.g., parity data, or mirrored data). Metadata for a directory may include, for example, an identifier for the directory, a listing of the files and subdirectories of the directory as well as the identifier for each of the files and subdirectories, as well as the type of protection for each file and subdirectory. In other embodiments, the metadata may also include the location of the directory's protection blocks (e.g., parity data, or mirrored data). The metadata data structures are stored in the intelligent distributed file system.

1. Distributed Mirrored Index Trees

In one embodiment, the intelligent distributed file system uses a distributed mirrored index tree to map the identifiers for a file or directory to the actual address of the file's or directory's metadata data structure. Thus, as metadata data structures are moved to different smart storage units or different address locations, only the index tree entries need needs to be updated. Other metadata data structures that reference that file or directory need not be updated to reflect the new location. Instead, the metadata data structures that reference that file or directory just use the identifier of that file or directory.

Figure 12:
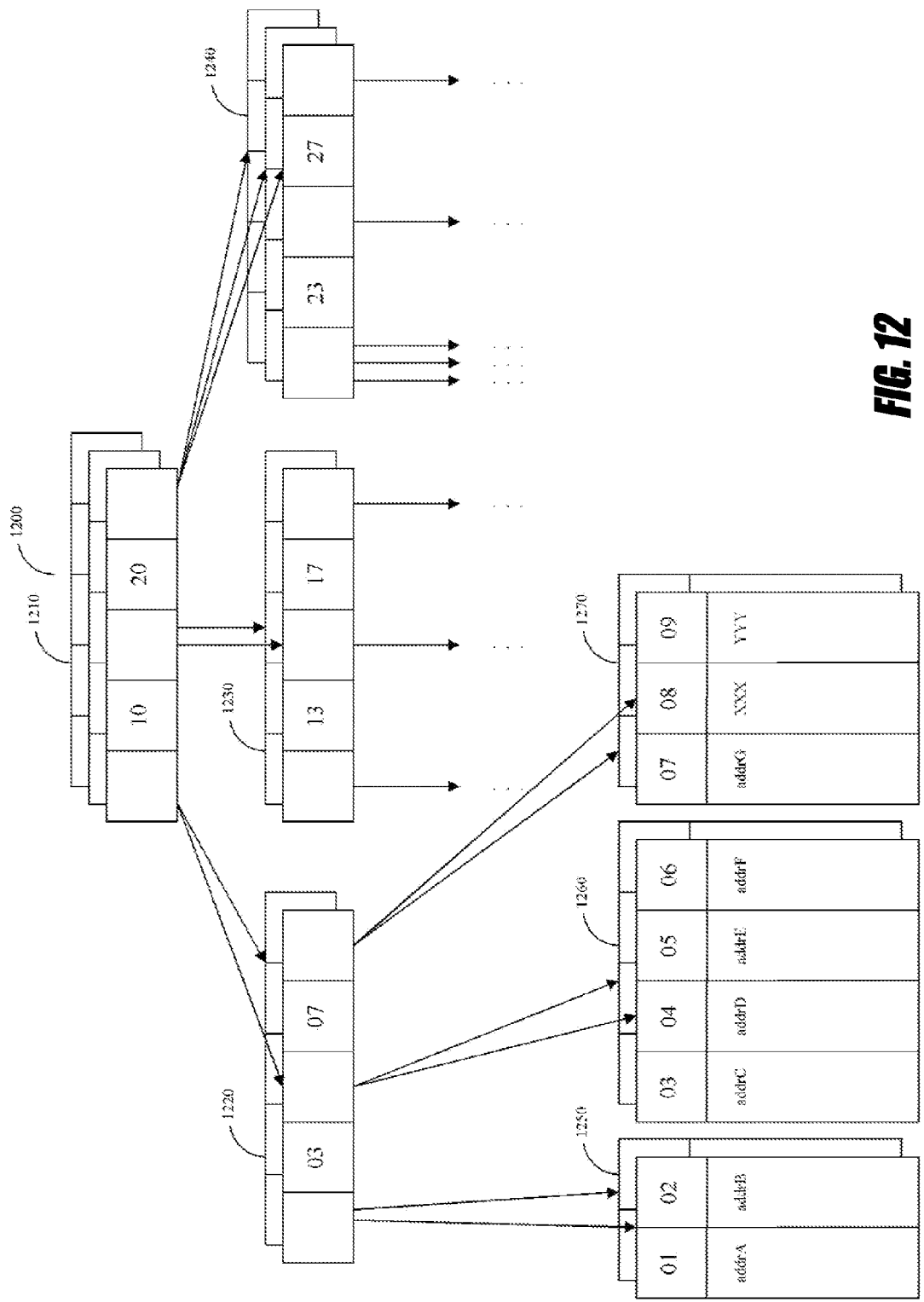
FIG. 12 illustrates one embodiment of a high-level block diagram of one embodiment of an index tree used to store addresses of metadata data structures.

FIG. 12 illustrates one embodiment of a distributed mirrored index tree 1200 that stores addresses of metadata data structures, or inodes, that are indexed by integers. The root node 1210 includes two index entries 10 and 20. Accordingly, entries with index values less than 10 are stored off the first branch of the root node 1210, entries with index values greater than or equal to 10 and less than 20 are stored off the second branch of the root node 1210, and entries with index values greater than or equal to 20 are stored off the third branch of root node 1210.

Similarly, inner node 1220 has index values 3 and 7. Accordingly, entries with index values less than 3 are stored off the first branch of the inner node 1220, entries with index values greater than or equal to 3 and less than 7 are stored off the second branch of the inner node 1220, and entries with index values greater than or equal to 7 (but presumably less than 10) are stored off the third branch of inner node 1220.

In addition, leaf node 1250 has index values 1 and 2. Accordingly, entries with index values of 1 or 2 are stored in the leaf node 1250. Similarly, entries with index values of 3, 4, 5, or 6 are stored in the leaf node 1260, and entries with index values of 7, 8, or 9 are stored in the leaf node 1270.

The exemplary index tree 1200 also maintains the protection level of the index tree. For example, leaf node 1250 is mirrored two times and root node 1210 is mirrored three times.

2. Example Leaf Node

Figure 13:
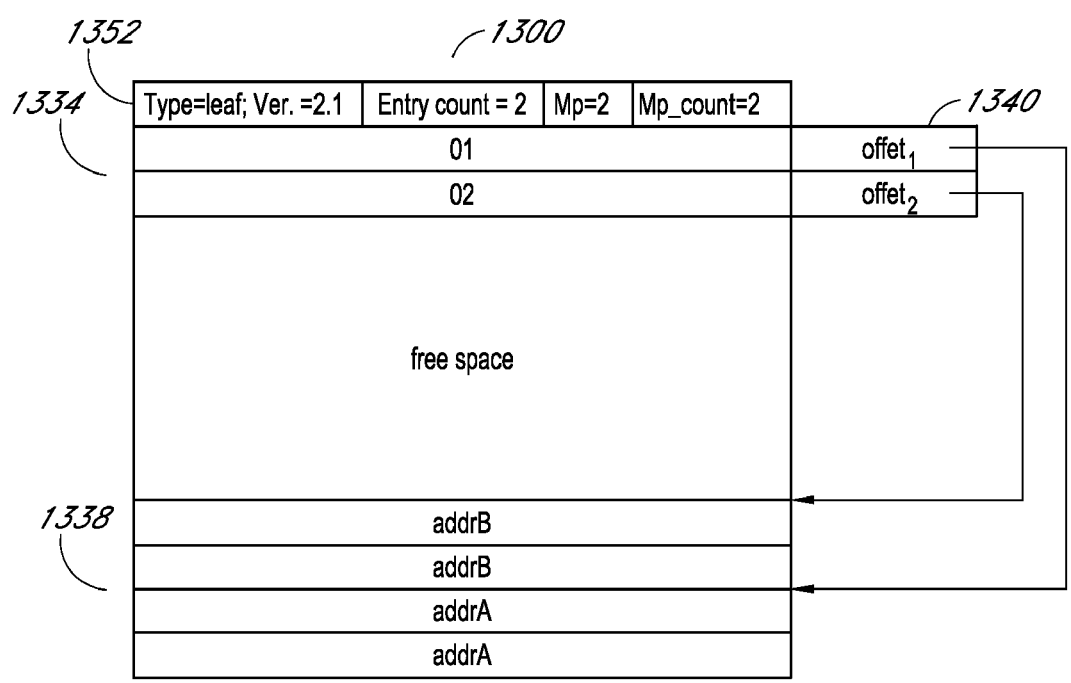
FIG. 13 illustrates one embodiment of a leaf node used to store database records.

FIG. 13 illustrates an example leaf node 1300 that corresponds to leaf node 1250. The exemplary leaf node 1300 includes a header 1352 noting that the node is a leaf node, the node is version 2.1, the number of entries is 2, the maximum protection is 2x, and the number of entries is 2. The entries 1334 include 01 and 02 whose corresponding offsets 1340 point to the respective copies of the address entries "addrA" and "addrB" 1338. In this example, "addrA" is the address of the metadata data structure with identifier 01.

Furthermore, as discussed above, FIGS. 11 and 13 illustrate examples of how the leaf node may be stored. Various configurations of the superblocks, inner nodes, and leaf nodes may be used.

V. Conclusion

Although the above-disclosed embodiments have shown, described, and pointed out the fundamental novel features of the invention as applied to the above-disclosed embodiments, it should be understood that various omissions, substitutions, and changes in the form of the detail of the devices, systems, and/or methods shown may be made by those skilled in the art without departing from the scope of the invention. Consequently, the scope of the invention should not be limited to the foregoing description, but should be defined by the appended claims.

What is claimed is:

1. A computer-implemented method of accessing a data unit stored at a leaf node of a distributed index tree, the method comprising:

using a reference from a superblock to access an available copy of a root node, copies of the root node stored on different devices among a plurality of storage devices, each copy of the root node comprising a first reference to a first copy of a branch of the distributed index tree and a second reference to a second copy of the branch, wherein the branch leads to one or more copies of a parent node;

accessing, by a computer processor, an available copy of the parent node, copies of the parent node stored on different devices among the plurality of storage devices, each copy of the parent node comprising a first electronic reference to a first copy of a leaf node stored on a first storage device, a second electronic reference to a second copy of the leaf node stored on a second storage device, and a third electronic reference to a third copy of the leaf node stored on a third storage device, the first storage device different from the second storage device;

determining, by a computer processor, that the first storage device is unavailable;

based on the determination that the first storage device is unavailable, choosing to access the second copy of the child node instead of the third copy of the child node based on a technique including at least one of a round robin technique based on the last storage device used, selecting a most recently used storage device, and choosing based on a preference of local storage devices over remote storage devices; and processing, by a computer processor, the second electronic reference to access the second copy of the leaf node stored on the second storage device.

2. The computer-implemented method of claim 1, further comprising:

maintaining at least as many copies of the parent node as the maximum number of copies of any of its one or more children, wherein the one or more children of the parent node include the leaf node.

3. The computer-implemented method of claim 1, further comprising:

creating a third copy of the leaf node;

storing the third copy of the leaf node on a third storage device which is different than the first storage device and the second storage device; and modifying each available copy of the parent node to include a reference to the third copy of the leaf node stored on the third storage device.

4. The computer-implemented method of claim 1, further comprising determining that a first copy of the parent node is stored on an unavailable device, and wherein accessing the available copy of the parent node comprises using a reference to a second copy of the parent node, the reference stored in a parent of the parent node.

5. The computer-implemented method of claim 1, further comprising maintaining a copy of the superblock on each of the plurality of storage devices.

6. The computer-implemented method of claim 5, further comprising maintaining an indication of a version of the superblock on each of the plurality of storage devices.

7. The computer-implemented method of claim 1, wherein the parent node and the leaf node each comprise one or more keys, and the data unit is associated with an index which corresponds to one of the one or more keys of the leaf node.

8. The computer-implemented method of claim 1, wherein the parent node is the root node.

9. The computer-implemented method of claim 1, wherein the data unit comprises a physical address.

10. The computer-implemented method of claim 1, wherein the data unit comprises at least one of a database record, a physical address, content data, and metadata.

11. The computer-implemented method of claim 1, wherein the distributed indexed tree is implemented using at least one of a balanced tree, a hash table and a linked list.

12. A system for accessing a data unit stored in a distributed index tree comprising:

one or more computer processors;

at least one computer memory accessible by at least one of the one or more computer processors; and a computing component comprising an executable software module executed by the one or more computer processors, wherein the computing component is operable to:

use a reference from a superblock to access an available copy of a root node, copies of the root node stored on different devices among a plurality of storage devices, each copy of the root node comprising a first reference to a first copy of a branch of the distributed index tree and a second reference to a second copy of the branch, wherein the branch leads to one or more copies of a parent node;

access an available copy of the parent node, copies of the parent node stored on different devices among the plurality of storage devices, each copy of the parent node comprising a first electronic reference to a first copy of a leaf node stored on a first storage device, a second electronic reference to a second copy of the leaf node stored on a second storage device, and a third electronic reference to a third copy of the leaf node stored on a third storage device, the first storage device different from the second storage device;

determine that the first storage device is unavailable;

based on the determination that the first storage device is unavailable, choose to access the second copy of the child node instead of the third copy of the child node based on a technique including at least one of a round robin technique based on the last storage device used, selecting a most recently used storage device, and choosing based on a preference of local storage devices over remote storage devices; and process the second electronic reference to access the second copy of the leaf node stored on the second storage device.

13. The system of claim 12, wherein the computing component is further operable to maintain at least as many copies of the parent node as the maximum number of copies of any of its one or more children, wherein the one or more children of the parent node include the leaf node.

14. The system of claim 12, wherein the computing component is further operable to:

create a third copy of the leaf node;

store the third copy of the leaf node on a third storage device which is different than the first storage device and the second storage device; and modify each available copy of the parent node to include a reference to the third copy of the leaf node stored on the third storage device.

15. The system of claim 12, wherein the computing component is further operable to determine that a first copy of the parent node is stored on an unavailable device, and wherein accessing the available copy of the parent node comprises using a reference to a second copy of the parent node, the reference stored in a parent of the parent node.

16. The system of claim 12, wherein the computing component is further operable to maintain a copy of the superblock on each of the plurality of storage devices.

17. The system of claim 16, wherein the computing component is further operable to maintain an indication of a version of the superblock on each of the plurality of storage devices.

18. The system of claim 12, wherein the parent node and the leaf node each comprise one or more keys, and the data unit is associated with an index which corresponds to one of the one or more keys of the leaf node.

19. The system of claim 12, wherein the parent node is the root node.

20. The system of claim 12, wherein the data unit comprises at least one of a database record, a physical address, content data, and metadata.

* * * * *